(12) United States Patent
Hara

(10) Patent No.: US 8,823,843 B2
(45) Date of Patent: Sep. 2, 2014

(54) IMAGE PROCESSING DEVICE, IMAGE CAPTURING DEVICE, IMAGE PROCESSING METHOD, AND PROGRAM FOR COMPENSATING FOR A DEFECTIVE PIXEL IN AN IMAGING DEVICE

(75) Inventor: Kazunari Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 264 days.

(21) Appl. No.: 13/337,752

(22) Filed: Dec. 27, 2011

(65) Prior Publication Data

US 2012/0176532 A1    Jul. 12, 2012

(30) Foreign Application Priority Data

Jan. 11, 2011   (JP) ................................. 2011-002667

(51) Int. Cl.
*H04N 9/64* (2006.01)
*G03B 13/36* (2006.01)
*H04N 5/369* (2011.01)
*H04N 9/07* (2006.01)

(52) U.S. Cl.
CPC .............. *G03B 13/36* (2013.01); *H04N 5/3696* (2013.01); *H04N 9/07* (2013.01)
USPC ............................ 348/246; 348/352; 348/345

(58) Field of Classification Search
USPC .................. 348/246–247, 345–356
See application file for complete search history.

(56) References Cited

U.S. PATENT DOCUMENTS

| 8,587,702 B2 * | 11/2013 | Hara ............................ 348/246 |
| 2010/0245631 A1 * | 9/2010 | Hoda et al. .................... 348/241 |
| 2011/0096189 A1 * | 4/2011 | Taniguchi ................... 348/222.1 |
| 2012/0155610 A1 * | 6/2012 | Murakoshi et al. ............. 378/62 |

FOREIGN PATENT DOCUMENTS

JP         2009-145401        7/2009

OTHER PUBLICATIONS

U.S. Appl. No. 13/335,173, filed Dec. 22, 2011, Hara.

* cited by examiner

*Primary Examiner* — Antoinette Spinks
(74) *Attorney, Agent, or Firm* — Oblon, Spivak, McClelland, Maier & Neustadt, L.L.P.

(57) ABSTRACT

An image processing device includes: a detection unit detecting a movement amount of an image between first image data constituting image data generated by an image capturing element provided with a plurality of image generating pixels generating pixel values for generating an image and a plurality of pairs of phase difference detecting pixels generating pixel values for performing focusing determination by phase difference detection, and second image data subsequent to the first image data on a time axis, wherein the movement amount is a movement amount of one phase difference detecting pixel when a defective pixel included in the pair of phase difference detecting pixels is one of the pair; and a correction unit correcting the pixel value of the defective pixel in the second image data on the basis of the detected movement amount and the pixel value of one phase difference detecting pixel in the first image data.

11 Claims, 13 Drawing Sheets

FIG. 2
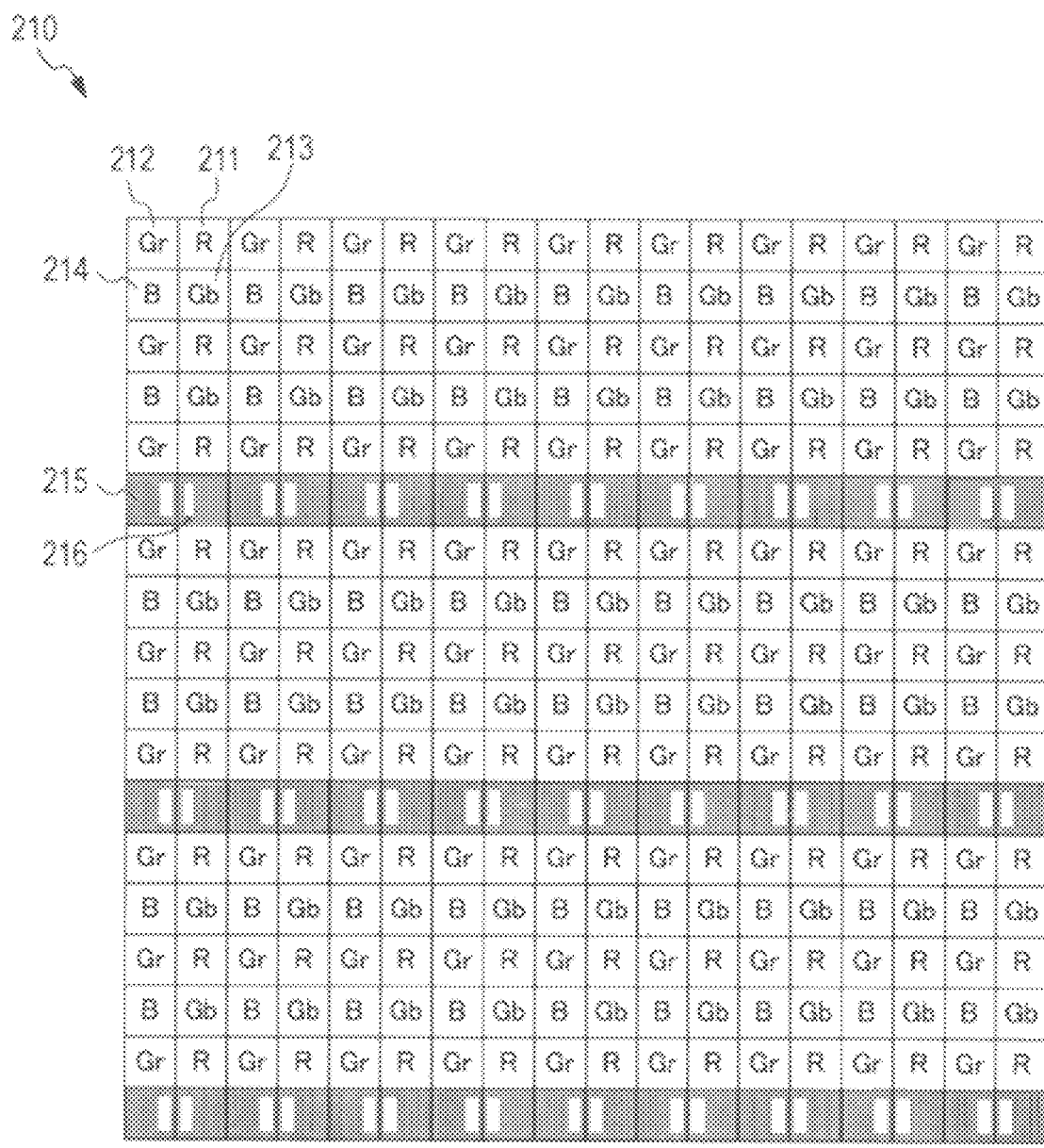
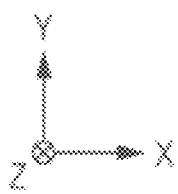

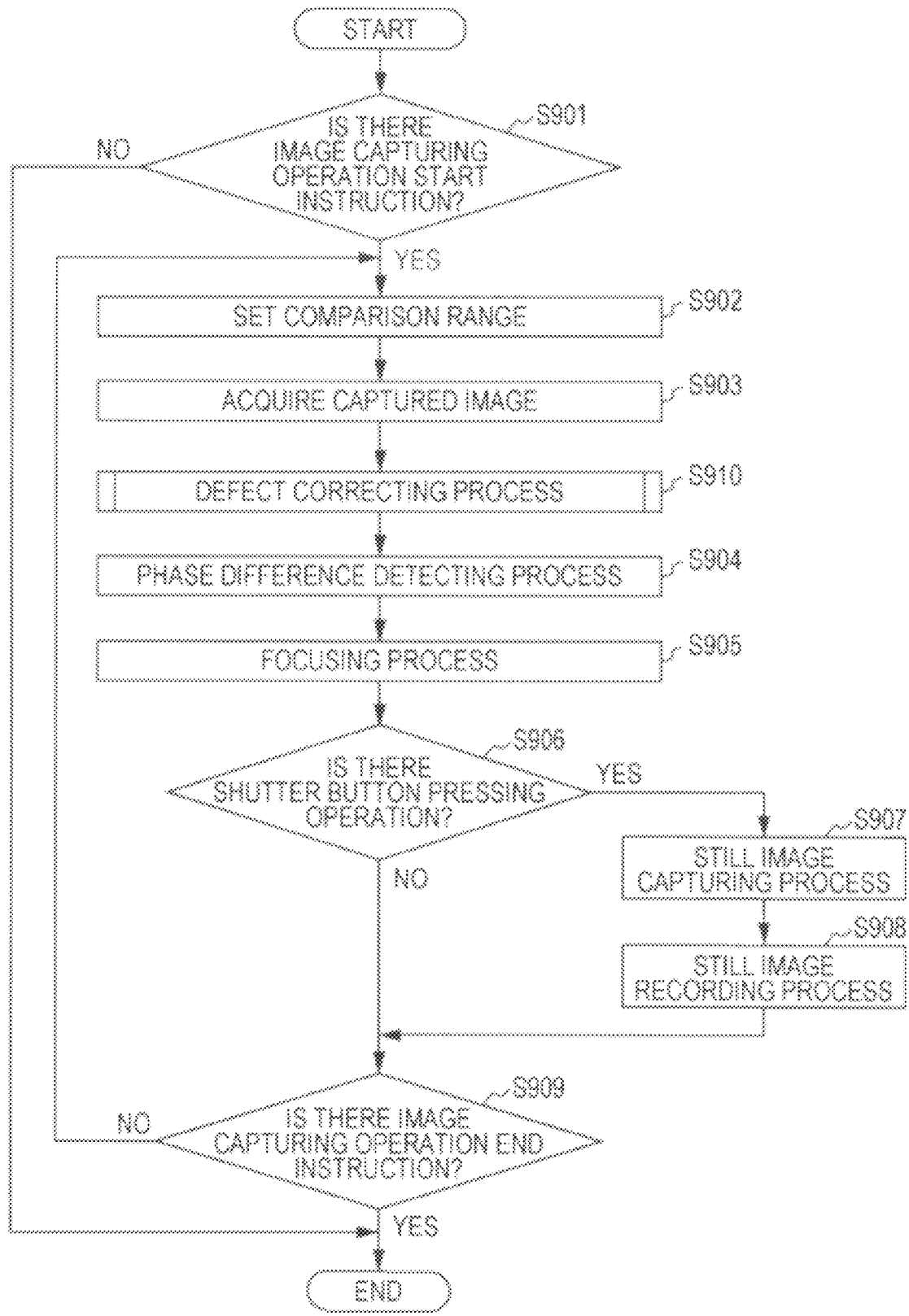

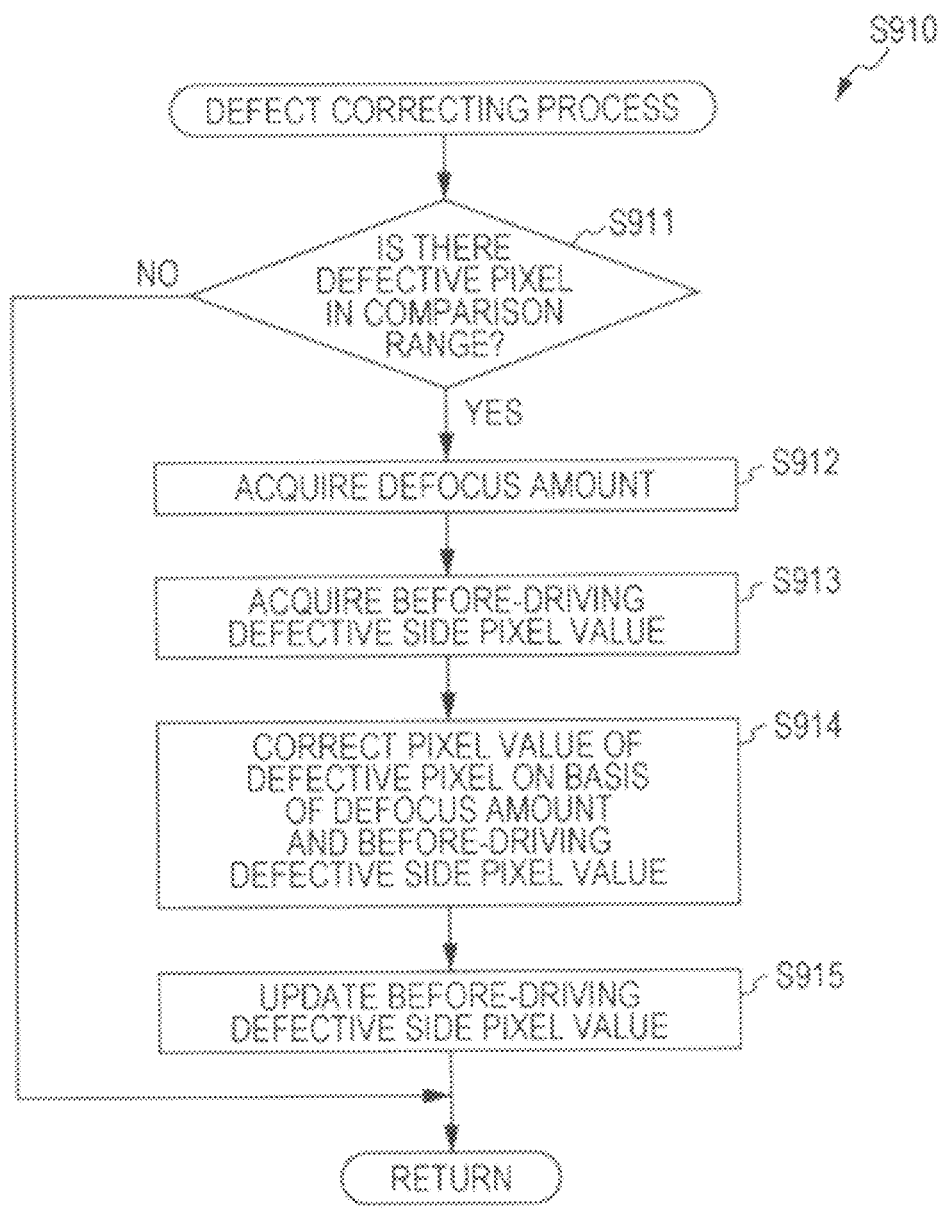

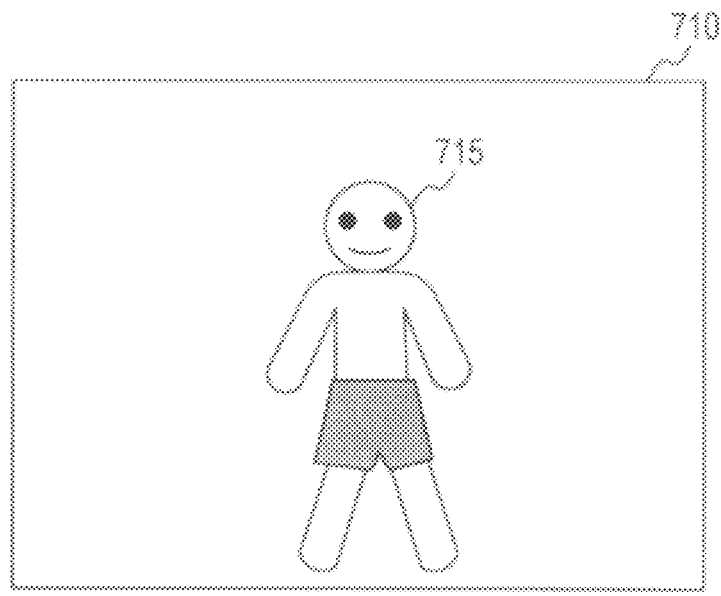
FIG. 10A
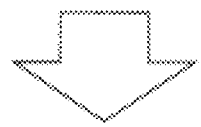
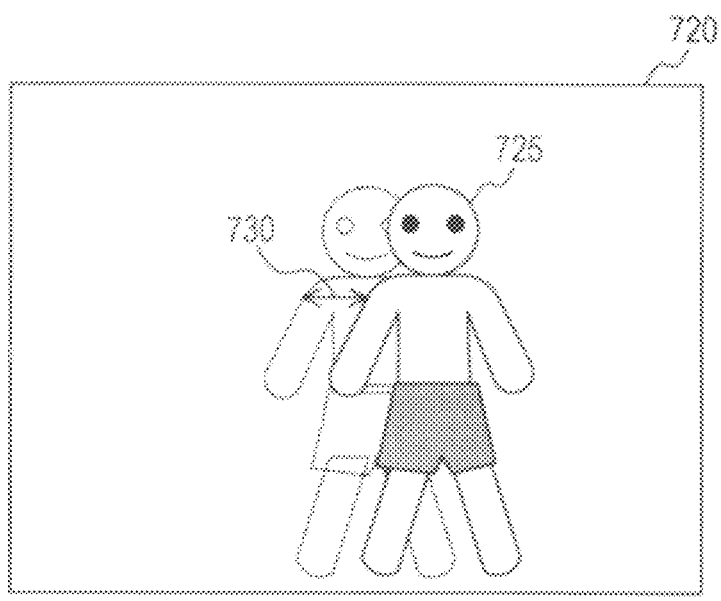
FIG. 10B

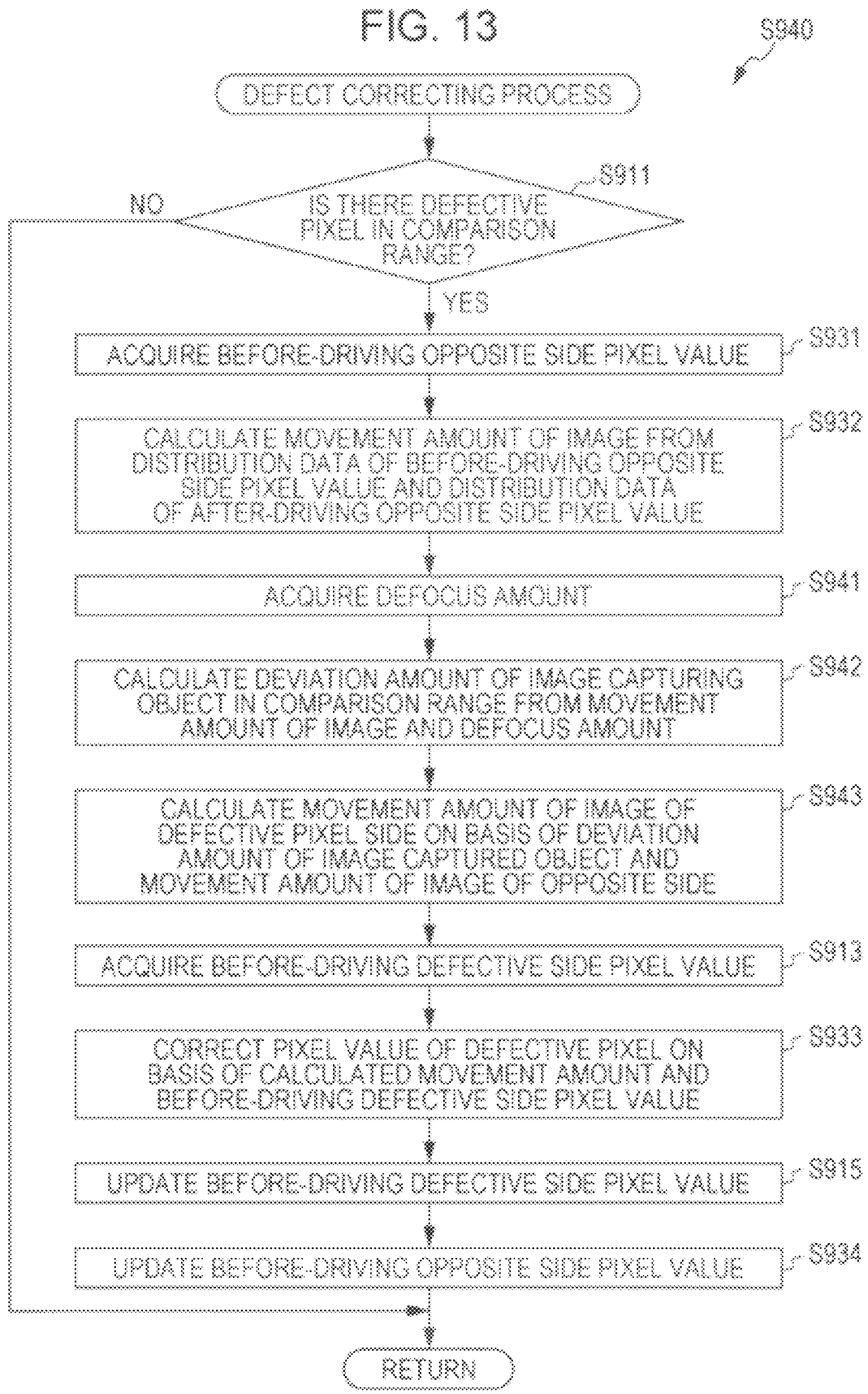

IMAGE PROCESSING DEVICE, IMAGE CAPTURING DEVICE, IMAGE PROCESSING METHOD, AND PROGRAM FOR COMPENSATING FOR A DEFECTIVE PIXEL IN AN IMAGING DEVICE

BACKGROUND

The present disclosure relates to an image processing device, and more particularly, to an image processing device correcting a pixel value, an image processing method, and a program for causing a computer to execute the method.

Recently, image capturing devices such as digital still cameras that capture an image of a photography subject such as a person using an image capturing element, generate a captured image, and store the generated captured image have come into wide use. As the image capturing element, an element in which color filters are disposed in Bayer arrangement on pixels disposed on a light receiving face has become widespread.

Recently, according to multi functions and high image quality of image capturing devices, an image capturing element in which pixels other than pixels for generating images disposed in the image capturing element are disposed or an image capturing element in which pixels provided with color filters other than color filters (R, G, and B) using the Bayer arrangement are disposed, has been studied. For example, an image capturing element is being studied in which the pixels for generating images (image generating pixels) of the related art and new pixels for multi functions are disposed in the same image capturing element.

For example, as an image capturing device provided with such an image capturing element, for example, an image capturing device has been proposed in which pixels (phase difference detecting pixels) performing pupil division on light passing through an image capturing lens are disposed in an image capturing element (for example, see Japanese Unexamined Patent Application Publication No. 2009-145401). The image capturing device forms a pair of images by providing the phase difference detecting pixels, which block a half of the light of the photography subject received by the light receiving element to perform the pupil division, with the image capturing element, and the image capturing device measures a distance between the pair of formed images to calculate a deviation amount of focus. The image capturing device calculates a movement amount of the image capturing lens on the basis of the calculated deviation of focus, and adjusts the position of the image capturing lens on the basis of the calculated movement amount to perform a focus control.

SUMMARY

In the related art described above, since both pixels of the phase difference detecting pixel and the image generating pixels are provided in one image capturing element, it is not necessary to individually provide two image capturing elements of an image capturing element for focus detection and an image capturing element for image capturing with the image capturing device.

In the related art described above, when there is a defective pixel in the phase difference detecting pixels, a pixel value of the defective pixel is corrected from an average value of pixel values of the phase difference detecting pixels (the phase difference detecting pixels receiving the light subjected to the pupil division in the same direction as that of the defective pixel) close to the defective pixel. However, it may be assumed that there is a defective pixel at a position of an edge in a high frequency image or there is an area where defective pixels are densely packed. In this case, it is difficult to appropriately perform the correction by the influence caused by the high frequency component or the defective pixels, and precision of the correction may be decreased. Even in this case, it is important to appropriately correct the defective pixels of the phase difference detecting pixels.

It is desirable to improve precision of correction of a pixel value of a defective pixel in phase difference detecting pixels.

According to a first embodiment of the present disclosure, there are provided an image processing device including: a detection unit that detects a movement amount of an image between first image data constituting image data generated by an image capturing element provided with a plurality of image generating pixels generating pixel values for generating an image and a plurality of pairs of phase difference detecting pixels generating pixel values for performing focusing determination by phase difference detection, and second image data subsequent to the first image data on a time axis, where the movement amount of the image is a movement amount of the image of one pair of phase difference detecting pixels when a defective pixel included in the one pair of phase difference detecting pixels is one of the one pair; and a correction unit that corrects the pixel value of the defective pixel in the second image data on the basis of the detected movement amount and the pixel value of one phase difference detecting pixel in the first image data corresponding to the defective pixel, an image processing method thereof, and a program for causing a computer to execute the method. With such a configuration, when the pair of phase difference detecting pixels includes the defective pixel and the defective pixel is one side, the pixel value of the defective pixel in the second image data is corrected on the basis of the movement amount of the image of one phase difference detecting pixel between the first image data and the second image data and the pixel value of one phase difference detecting pixel in the first image data.

In the first embodiment, the second image data may be image data generated after the first image data on the time axis. With such a configuration, the second image data is captured as the image data captured after the first image data.

In this case, the image processing device may further include a calculation unit that calculates a defocus amount by the phase difference detection on the basis of the pixel values of the phase difference detecting pixels, and the detection unit may detect the movement amount on the basis of the defocus amount calculated from the pixel values of the phase difference detecting pixels in the first image data. With such a configuration, the movement amount of the image of one phase difference detecting pixel is detected on the basis of the defocus amount calculated from the pixel value of the phase difference detecting pixel in the first image data.

In this case, the detection unit may calculate the movement amount of the image of the other phase difference detecting pixel on the basis of a distance between the image of the other phase difference detecting pixel in the first image data and the image of the other phase difference detecting pixel in the second image data, and may detect the movement amount of the image of one phase difference detecting pixel on the basis of the calculated movement amount of the image of the other phase difference detecting pixel. With such a configuration, the movement amount of the image of the other phase difference detecting pixel is calculated on the basis of the distance between the image of the other phase difference detecting pixel in the first image data and the image of the other phase difference detecting pixel in the second image data, and the movement amount of the image of one phase difference detecting pixel is detected on the basis of the calculated movement amount of the image of the other phase difference detecting pixel.

In this case, the image processing device may further include a calculation unit that calculates a defocus amount by the phase difference detection on the basis of the pixel values of the phase difference detecting pixels, wherein the detection unit may calculate the movement amount of the image of the other phase difference detecting pixel on the basis of a distance between the image of the other phase difference detecting pixel in the first image data and the image of the other phase difference detecting pixel in the second image data, and may detect the movement amount of the image of one phase difference detecting pixel on the basis of the movement amount of the image of the other phase difference detecting pixel and the defocus amount calculated from the pixel values of the phase difference detecting pixels in the first image data. With such a configuration, the movement amount of the image of one phase difference detecting pixel is detected on the basis of the movement amount of the image of the other phase difference detecting pixel and the defocus amount calculated from the pixel value of the phase difference detecting pixel in the first image data.

In this case, the calculation unit may calculate a deviation amount of a position relating to an object included in the second image data corresponding to the position of the defective pixel between the first image data and the second image data on the basis of the defocus amount and the movement amount of the image of the other phase difference detecting pixel, and may detect the movement amount of the image of one phase difference detecting pixel on the basis of the calculated deviation amount and the defocus amount. With such a configuration, the deviation amount of the position relating to the object captured by the defective pixel between the first image data and the second image data, and the movement of the image of one phase difference detecting pixel is detected on the basis of the calculated deviation amount and the defocus amount.

In this case, the image processing device may further include a calculation unit that calculates a defocus amount by the phase difference detection on the basis of the pixel values of the phase difference detecting pixels, wherein the detection unit may calculate the movement amount of the image of the image generating pixel on the basis of the distance between the image of the image generating pixel in the first image data and the image of the image generating pixel in the second image data, and may detect the movement amount of the image of one phase difference detecting pixel on the basis of the calculated movement amount of the image of the image generating pixel and the defocus amount calculated from the pixel value of the phase difference detecting pixel in the first image data. With such a configuration, the movement amount of the image of one phase difference detecting pixel is detected on the basis of the movement amount of the image of the image generating pixel and the defocus amount calculated from the pixel value of the phase difference detecting pixel in the first image data.

In this case, the image generating pixels may include a red pixel covered with a red filter blocking light other than a wavelength area representing red, a blue pixel covered with a blue filter blocking light other than a wavelength area representing blue, and a green pixel covered with a green filter blocking light other than a wavelength area representing green, and the movement amount of the image of the pixel generating pixel may be a movement amount of an image of the green pixel. With such a configuration, the movement amount of the image of one phase difference detecting pixel is detected on the basis of the movement amount of the image of the green pixel and the defocus amount calculated from the pixel value of the phase difference detecting pixel in the first image data.

According to a second embodiment of the present disclosure, there is provided an image capturing device including: an image capturing element that includes a plurality of image generating pixels generating pixel values for generating an image, and a plurality of pairs of phase difference detecting pixels generating pixel values for performing focusing determination by phase difference detection; a detection unit that detects a movement amount of an image between first image data constituting image data generated by the image capturing element and second image data subsequent to the first image data on a time axis, wherein the movement amount of the image is a movement amount of the image of one pair of phase difference detecting pixels when a defective pixel included in the one pair of phase difference detecting pixels is one of the one pair; a correction unit that corrects the pixel value of the defective pixel in the second image data on the basis of the detected movement amount and the pixel value of one phase difference detecting pixel in the first image data corresponding to the defective pixel; a determination unit that determines whether or not it is focused on a focus target object on the basis of the corrected pixel value of the phase difference detecting pixels; and a control unit that controls driving of a lens on the basis of the determination result of the determination unit. With such a configuration, the focusing determination is performed on the basis of the pixel value in which the pixel value of the defective pixel is corrected.

According to the present disclosure, there is an excellent effect of improving precision of correction of a pixel value of a defective pixel of phase difference detecting pixels.

BRIEF DESCRIPTION OF THE DRAWINGS

FIG. 2 is a schematic diagram illustrating an example of disposition of pixels provided in an image capturing element in the embodiment of the present disclosure.

FIG. 5 is a flowchart illustrating an example of a sequence of an image capturing process when performing correction of a defective phase difference detecting pixel by the image capturing device in the first embodiment of the present disclosure.

FIG. 6 is a flowchart illustrating an example of a sequence of a process of a defect correcting process (Step S910) in an image capturing process operation of the first embodiment of the present disclosure.

FIG. 10A and FIG. 10B are schematic diagrams illustrating an example of transition of a photography subject included in an image capturing range.

FIG. 13 is a flowchart illustrating an example of a sequence of a defect correcting process (Step S940) in an image capturing process operation of the third embodiment of the present disclosure.

DETAILED DESCRIPTION OF EMBODIMENTS

Hereinafter, embodiments for embodying the present disclosure (hereinafter, referred to as embodiments) will be described. The description is performed in the following sequence.

1. First Embodiment (Image Capturing Control: Example of Correction using Defocus Amount)
2. Second Embodiment (Image Capturing Control: Example of Correction using Movement Amount of Image)
3. Third Embodiment (Image Capturing Control: Example of Correction using Defocus Amount and Movement Amount of Image)

1. First Embodiment

Example of Functional Configuration of Image Capturing Device

Figure 1:
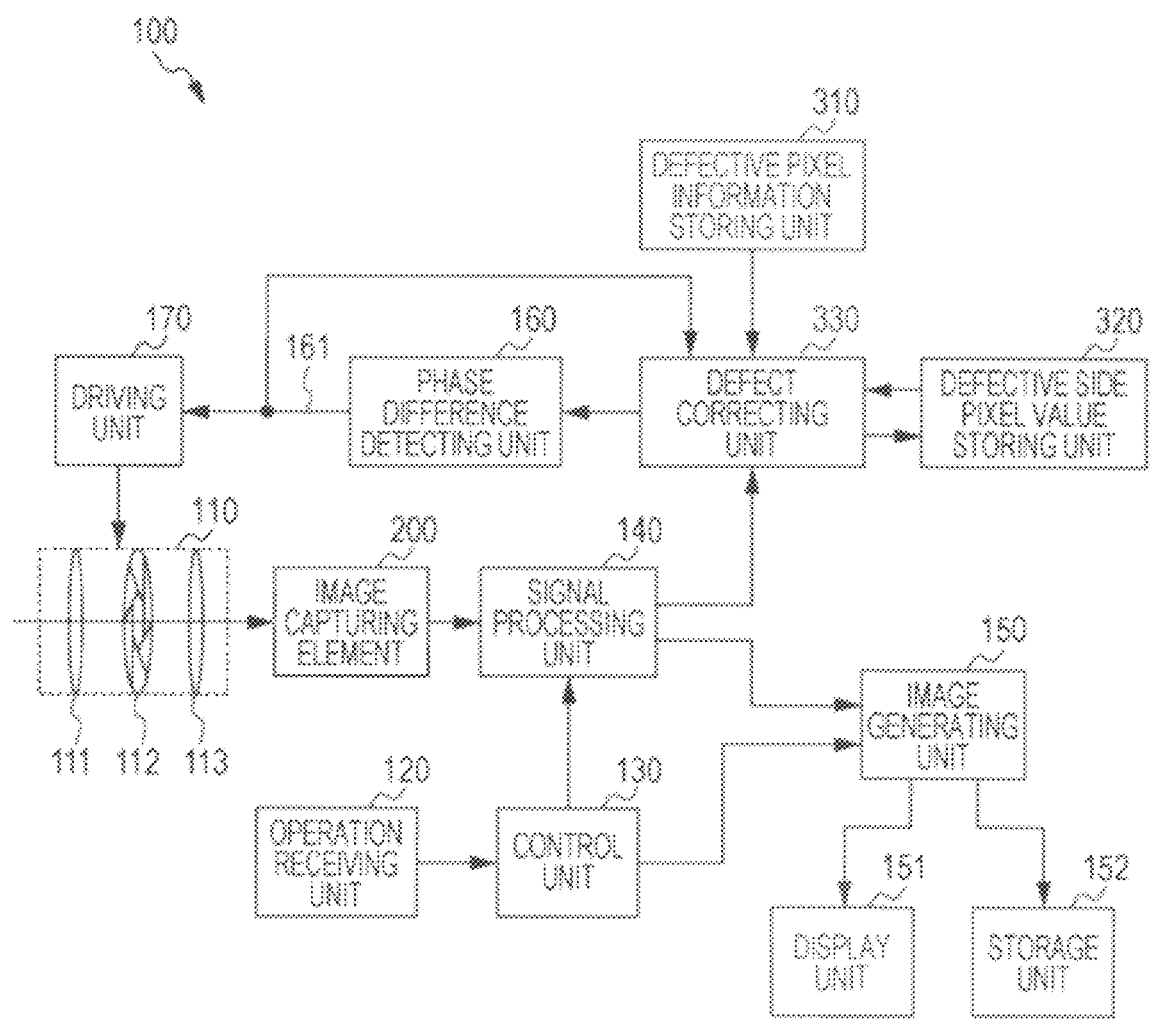
FIG. 1 is a block diagram illustrating an example of a function configuration of an image capturing device in a first embodiment of the present disclosure.

FIG. 1 is a block diagram illustrating an example of a functional configuration of an image capturing device 100 in a first embodiment of the present disclosure. The image capturing device 100 captures an image of a photography subject, generates image data (captured image), and records the generated image data as an image content (a still image content or a movie content). Hereinafter, an example of recording the still image content (still image file) as the image content (image file) will be mainly described.

The image capturing device 100 includes a lens unit 110, an operation receiving unit 120, a control unit 130, an image capturing element 200, a signal processing unit 140, an image generating unit 150, a display unit 151, and a storage unit 152. The image capturing device 100 includes a defective pixel information storing unit 310, a defective side pixel value storing unit 320, a defect correcting unit 330, a phase difference detecting unit 160, and a driving unit 170.

The lens unit 110 collects light from a photography subject (photography subject light). The lens unit 110 includes a zoom lens 111, a diaphragm 112, and a focus lens 113.

The zoom lens 111 moves in an optical axis direction by driving of the driving unit 170 to change a focus length, and adjusts a magnification of the photography subject included in the captured image.

The diaphragm 112 is a shielding object changing a degree of an aperture by driving of the driving unit 170 to adjust light quantity of the photography subject light entering the image capturing element 200.

The focus lens 113 moves in the optical axis direction by driving of the driving unit 170 to adjust a focus.

The operation receiving unit 120 receives an operation from a user. For example, when a shutter button (not shown) is pressed, the operation receiving unit 120 supplies a signal relating to the pressing as an operation signal to the control unit 130.

The control unit 130 controls operation of units in the image capturing device 100. In FIG. 1, only main signal lines are shown, and the others are not shown. For example, when the shutter button is pressed and an operation signal for starting recording of a still image is received, the control unit 130 supplies a signal relating to performance of recording of the still image to the signal processing unit 140.

The image capturing element 200 is an image sensor photoelectrically converting the received photography subject light into an electrical signal. The image capturing element 200 is realized by, for example, a CMOS (Complementary Metal Oxide Semiconductor) sensor or a CCD (Charge Coupled Device) sensor. The image capturing element 200 is provided with pixels (image generating pixels) generating signals for generating the captured image on the basis of the received photography subject light, and pixels (phase difference detecting pixels) generating signals for performing phase difference detection. The phase difference detection is a focus detecting method of performing pupil division on light passing through the image capturing lens, forming a pair of images, and measuring (detecting a phase difference) a distance (a deviation amount between the images) between the formed images to detect a degree of focusing.

The image capturing element 200 is provided with a pixel (R pixel) receiving red light by a color filter allowing red (R) light to pass, and a pixel (G pixel) receiving green light by a color filter allowing green (G) light to pass, as the image generating pixels. In addition, the image capturing element 200 is provided with a pixel (B pixel) receiving blue light by a color filter allowing blue (B) light to pass, as the image generating pixel in addition to the R pixel and the G pixel. The image capturing element 200 will be described with reference to FIG. 2. The image capturing element 200 supplies the electrical signal (image signal) generated by the photoelectric conversion to the signal processing unit 140 by a unit of image (image data).

The signal processing unit 140 performs a predetermined signal process on the electrical signal supplied from the image capturing element 200 to correct the image signal. The signal processing unit 140, for example, converts the electrical signal supplied from the image capturing element 200 into a digital electrical signal (pixel value), and then performs black level correction, defect correction, shading correction, mixed color correction, and the like. In the defect correction performed by the signal processing unit 140, the pixel value of the pixel (defective image generating pixel), which does not normally function, in the image generating pixels is estimated and corrected from the pixel values in neighboring pixels of the defective image generating pixel. Meanwhile, the pixel (defective phase difference detecting pixel), which does not normally function, in the phase difference detecting pixels, is not corrected by the signal processing unit 140 and is corrected by the defect correcting unit 330. The signal processing unit 140 supplies the pixel value generated by the phase difference detecting pixel of the pixel values subjected to such a correction process, to the defect correcting unit 330. The signal processing unit 140 supplies the pixel value generated by the image generating pixel of the pixel values subjected to such a correction process, to the image generating unit 150.

The image generating unit 150 performs a predetermined signal process on the image data generated by the image generating pixel supplied from the signal processing unit 140, and generates image data to be displayed on the display unit 151 or image data to be stored in the storage unit 152. The image generating unit 150 performs, for example, white balance correction, γ correction, a demosaic process, an image compressing process, and the like on the image data. The image generating unit 150 supplies the image data to be displayed on the display unit 151 to the display unit 151, and displays the image data on the display unit 151. The image generating unit 150 supplies the image data to be stored in the storage unit 152 to the storage unit 152, and stores the image data in the storage unit 152.

The display unit 151 displays the image on the basis of the image data supplied from the image generating unit 150. The display unit 151 is realized by, for example, a color liquid crystal panel.

The storage unit 152 records the image data supplied from the image generating unit 150, as the image content (image file). For example, as the storage unit 152, a disk such as a DVD (Digital Versatile Disc), or a removable recording medium (one or more recording mediums) such as a semiconductor memory such as a memory card may be used. Such a recording medium may be built into the image capturing device 100, and may be attachable and detachable from the image capturing device 100.

The defective pixel information storing unit 310 stores information (defective pixel information) relating to the position of the phase difference detecting pixel (defective phase difference detecting pixel) which does not normally function in the image capturing element 200. For example, the defective pixel information storing unit 310 stores the position of the defective phase difference detecting pixel detected in the course of function check of the image capturing element 200 in the course of producing the image capturing device 100, as the defective pixel information. The defective pixel information storing unit 310 supplies the defective pixel information to the defect correcting unit 330.

The defective side pixel value storing unit 320 stores the pixel value (defective side pixel value) of the phase difference detecting pixel, in which the same side as the defective phase difference detecting pixel is opened, of the pixel values generated for a previous image capturing in time series (time axis) from the image capturing of the pixel value corrected by the defect correcting unit 330. That is, the defective side pixel value storing unit 320 stores the defective side pixel value (before-driving defective side pixel value) before the focus lens 113 is driven by the focusing determination in the previous image capturing. The before-driving defective side pixel value stored by the defective side pixel value storing unit 320 is updated by the defective side pixel value of the image data considered as the correction target when the pixel value of the defective phase difference detecting pixel is corrected by the defect correcting unit 330. The defective side pixel value storing unit 320 supplies the stored before-driving defective side pixel value to the defect correcting unit 330.

The defect correcting unit 330 corrects the pixel value of the defective phase difference detecting pixel. The defect correcting unit 330 detects whether or not there is a defective phase difference detecting pixel in a comparison range and detects the position of the defective phase difference detecting pixel, on the basis of the defective pixel information supplied from the defective pixel information storing unit 310. The defect correcting unit 330 calculates the movement amount of the image of the defective side pixel value by the driving of the focus lens on the basis of the focusing determination result (defocus amount) supplied from the phase difference detecting unit 160. Subsequently, the defect correcting unit 330 corrects the pixel value of the defective phase difference detecting pixel of the pixel values of the phase difference detecting pixels supplied from the signal processing unit 140 on the basis of the calculated movement amount of the image and the before-driving defective side pixel value supplied from the defective side pixel value storing unit 320. The defect correcting unit 330 supplies the pixel value of the phase difference detecting pixel obtained by correcting the pixel value of the defective phase difference detecting pixel to the phase difference detecting unit 160. When the correction of the pixel value of the defective phase difference detecting pixel is completed, the defect correcting unit 330 updates the before-driving defective side pixel value by the defective side pixel value of the pixels of the phase difference detecting pixels supplied from the signal processing unit 140. The correction performed by the defect correcting unit 330 will be described with reference to FIG. 3A to FIG. 3D. The defect correcting unit 330 is an example of a detection unit and a correction unit described in Claims.

The phase difference detecting unit 160 determines whether or not the focus is matched with an object (focusing target object) of a target of focusing by the phase difference detection on the basis of the pixel value of the phase difference detecting pixel supplied from the defect correcting unit 330. In the embodiment of the present disclosure, for convenience of description, the phase difference detecting unit 160 performs determination on the basis of the pixel values of the phase difference detecting pixels of one comparison range. The phase difference detecting unit 160 forms a pair of images from the pixel values of the phase difference detecting pixels in the comparison range, and performs the focusing determination from the distance between the formed images. That is, the phase difference detecting unit 160 detects whether or not the focus is matched on the object (focusing target object) in the area of focusing from one pair of images generated from the pixel values of the phase difference detecting pixels in the comparison range. When the focus is matched, the phase difference detecting unit 160 supplies information (focusing determination result information) representing the focusing to the driving unit 170 and the defect correcting unit 330 through the signal line 161. When the focus is not matched on the focusing target object, the deviation amount (defocus amount) of the focus is calculated, and information (for example, a value representing the number of pixels of deviation) representing the calculated defocus amount is supplied as the focusing determination result information to the driving unit 170 and the defect correcting unit 330. The phase difference detecting unit 160 is an example of a calculation unit and a determination unit described in Claims.

The driving unit 170 drives the zoom lens 111, the diaphragm 112, and the focus lens 113. For example, the driving unit 170 calculates the driving amount of the focus lens 113 on the basis of the focusing determination result information output from the phase difference detecting unit 160, and moves the focus lens 113 according to the calculated driving amount. When the focus is matched, the driving unit 170 keeps the current position of the focus lens 113. When the focus deviates, the driving unit 170 calculates the driving amount (movement distance) on the basis of the focusing determination result information representing the defocus amount and the position information of the focus lens 113, and moves the focus lens 113 according to the driving amount. The driving unit 170 is an example of a control unit described in Claims.

Example of Disposition of Pixels of Image Sensor

FIG. 2 is a schematic diagram illustrating an example of disposition of pixels provided in the image capturing element 200 in the embodiment of the present disclosure.

In FIG. 2, XY axes in which the left and right direction is an X axis and the up and down direction is a Y axis are assumed and described. In FIG. 2, the left lower edge is the origin in the XY axes, the direction from the downside to the upside is a plus side of the Y axis, and the direction from the left to the right is a plus side of the X axis. A reading direction of signals in the image capturing element 200 is the X axis direction (read by a unit of row).

In FIG. 2, for convenience of description, the description is performed using an area (area 210) of partial pixels (pixels of 18 rows×18 columns) of the pixels constituting the image capturing element 200. In the disposition of pixels in the image capturing element 200 in which pixel disposition indicated for the area 210 is one unit, pixel disposition (pixel disposition corresponding to the area 210) corresponding to the unit is repeated in the X axis direction and the Y axis direction.

In FIG. 2, one pixel is one square. In the image generating pixels, signs (R, G, and B) representing provided color filters are indicated by squares shown therein. That is, the R pixels of the image generating pixels are represented by R pixels 211 in FIG. 2, and the B pixels of the image generating pixels are represented by B pixels 214 in FIG. 2. As for the G pixels, G pixels in the row (line) including the R pixels (R pixels 211) are represented by Gr pixels (Gr pixels 212), and G pixels in the row (line) including the B pixels (B pixels 214) are represented by Gb pixels (Gb pixels 213).

The phase difference detecting pixels are represented by gray squares to which a white rectangle is applied. The white rectangles in the phase difference detecting pixels represent the side (the side on which there is an opening portion in the light shielding layer) on which the incident light is not shielded by a light shielding layer and is received by the light receiving element. The phase difference detecting pixels (right opening phase difference detecting pixel 215 and left opening phase difference detecting pixel 216) shown in FIG. 2 will be described.

The right opening phase difference detecting pixel 215 is a phase difference detecting pixel in which the light shielding layer is formed such that a right half of the light receiving element is open and a left half of the light receiving element is shielded. That is, the right opening phase difference detecting pixel 215 shields the photography subject light passing through the right half (plus side of the X axis direction) of an exit pupil of the photography subject light entering the micro lens of the right opening phase difference detecting pixel 215. The right opening phase difference detecting pixel 215 receives the photography subject light passing through the left half (minus side of the X axis direction) of an exit pupil of the photography subject light entering the micro lens of the right opening phase difference detecting pixel 215, by the light receiving element.

The left opening phase difference detecting pixel 216 is a phase difference detecting pixel in which the light shielding layer is formed such that a left half of the light receiving element is open and a right half of the light receiving element is shielded. That is, the left opening phase difference detecting pixel 216 shields the photography subject light passing through the left half (minus side of the X axis direction) of an exit pupil of the photography subject light entering the micro lens of the left opening phase difference detecting pixel 216. The left opening phase difference detecting pixel 216 receives the photography subject light passing through the right half (plus side of the X axis direction) of an exit pupil of the photography subject light entering the micro lens of the left opening phase difference detecting pixel 216, by the light receiving element. The left opening phase difference detecting pixel 216 is used for the pair with the right opening phase difference detecting pixel 215 to form one pair of images.

Hereinafter, disposition of the pixels in the image capturing element 200 will be described.

In the image capturing element 200, a plurality of rows (lines) in which the image generating pixels are disposed and one row (line) in which the phase difference detecting pixels are disposed are alternately disposed in a direction (a column direction in the embodiment of the present disclosure) parallel to the reading direction. FIG. 2 shows an example in which the number of rows of the continuous image generating pixels is 5 rows. In the rows of the continuous image generating pixels, the image generating pixels are positioned in Bayer arrangement. FIG. 2 shows an example in which the rows of the image generating pixels adjacent to the row of the phase difference detecting pixels are rows in which the R pixels and the Gr pixels are disposed.

Example of Correction of Pixel Value of Defective Phase Difference Detecting Pixel in Defect Correction Unit FIG. 3A to FIG. 3D are schematic diagrams illustrating an example of correction of the pixel value of the defective phase difference detecting pixel by the defect correcting unit 330 in the first embodiment of the present disclosure.

Figure 3A:
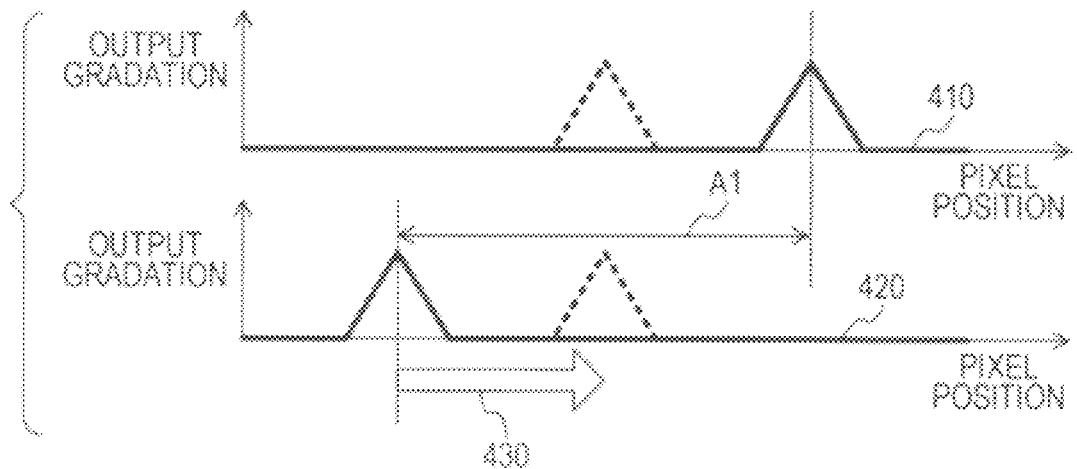
FIG. 3A to FIG. 3D are schematic diagrams illustrating an example of correction of a pixel value of a defective phase difference detecting pixel by a defect correcting unit in the first embodiment of the present disclosure.

FIG. 3A schematically shows an example of phase difference detection by the phase difference detecting unit 160 to describe the focusing determination result information supplied to the defect correcting unit 330 by the phase difference detecting unit 160.

Graphs shown in FIG. 3A schematically show the phase difference detection by the phase difference detecting unit 160 in which the vertical axis is intensity (output gradation) of the pixel value of each pixel and the horizontal axis is the position (pixel position) of each pixel. FIG. 3A shows distribution data (distribution data 410) generated from the pixel value of the left opening phase difference detecting pixel, and distribution data (distribution data 420) generated from the pixel value of the right opening phase difference detecting pixel by thick solid lines. The position (the position where the thick solid line protrudes) where one output gradation is high in the distribution data 410 and the distribution data 420 represents an edge of each distribution data.

In the distribution data 410 and the distribution data 420, the position where the image (edge) in the distribution data 410 and the image (edge) in the distribution data 420 are overlapped at the time of focusing is represented by the edge of a dotted line in each graph. The distance between the image in the distribution data 410 and the image in the distribution data 420 is represented by a distance A1, and the defocus amount specified by the focusing determination result information and indicated by the movement amount of the distribution data 420 is represented by an arrow 430.

The focusing determination result information supplied to the defect correcting unit 330 by the phase difference detecting unit 160 will be described. The phase difference detecting unit 160 detects the distance A1 and detects that the focus is matched by how much the pair of images have moved. In the distribution data 410 and the distribution data 420, since the position where two images are overlapped is the center of the distance A1, the images are close to each other at a value (the number of pixels) of a half of the distance A1 and thus two images are overlapped. The phase difference detecting unit 160 supplies the movement amount of a half of the distance A1 and the movement direction (for example, the arrow 430 in FIG. 3A) as the defocus amount (focusing determination result information) to the driving unit 170 and the defect correcting unit 330.

Figure 3B:
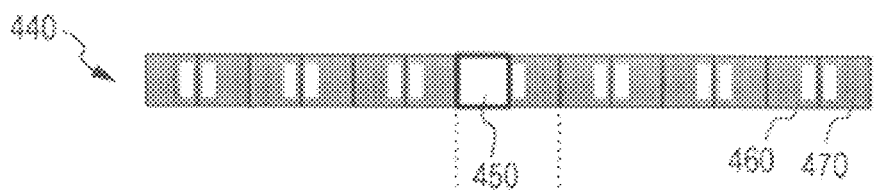

FIG. 3B shows an area (pixel area 440) schematically showing the comparison range including one defective phase difference detecting pixel. In the pixel area 440, fourteen phase difference detecting pixels disposed in one row are shown. In the pixel area 440, it is shown that the seventh right opening phase difference detecting pixel (the right opening phase difference detecting pixel 460) from the left side of the row of the phase difference detecting pixels is the defective phase difference detecting pixel (defective pixel 450). In FIG. 3B, it is assumed that there is no defective phase difference detecting pixel in the left opening phase difference detecting pixels (left opening phase difference detecting pixels 470).

Figure 3C:
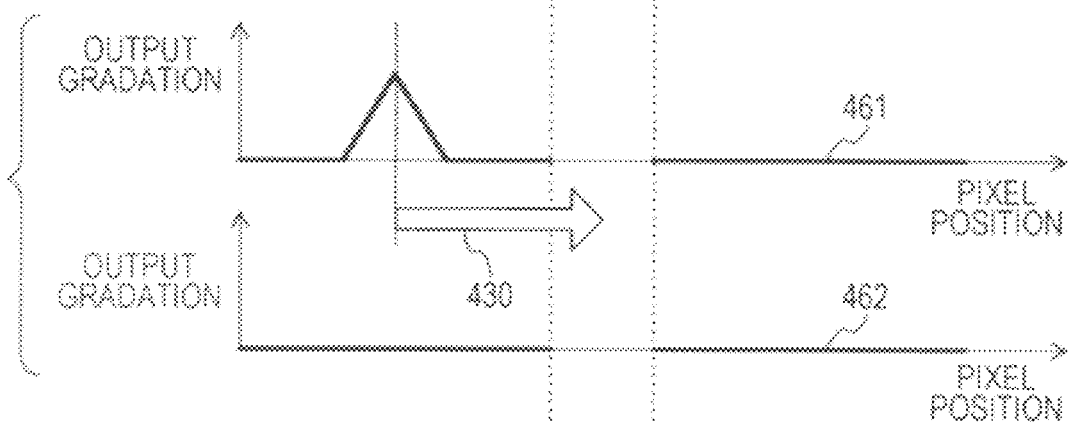

In FIG. 3C, the correction of the pixel value of the defective pixel 450 is schematically shown using distribution data (distribution data 462) relating to correction target image capturing data (n-th) and distribution data (distribution data 461) relating to previous image capturing data ((n−1)-th) of the correction target image capturing data. In FIG. 3C, the defocus amount (arrow 430) shown in FIG. 3B is represented by the arrow 430 extending from the center of the edge of the distribution data 461 to the defective pixel 450.

Hereinafter, the correction of the pixel value of the defective phase difference detecting pixel (defective pixel 450) by the defect correcting unit 330 will be described. The defocus amount (arrow 430) is information for calculating the driving amount of the focus lens from the amount to move the image, and represents the movement amount (absolute value and movement direction) of the distribution data 461 estimated by the driving amount of the focus lens. That is, the defocus amount (arrow 430) represents the movement amount of the edge (image) between the image capturing data ((n−1)-th) and the image capturing data (n-th). The defect correcting unit 330 corrects the image after moving on the basis of the defective side pixel value before moving (before-driving defective side pixel value) based on the focusing determination result information (defocus amount), the defective side pixel value after moving, the defective pixel information, and the focusing determination result information.

Specifically, the defect correcting unit 330 considers the distribution data based on the defective side pixel value stored in the defective side pixel value storing unit 320 as the image before moving based on the focusing determination result information, and considers the distribution data of the defective side pixel value of the pixel values supplied from the signal processing unit 140 as the image after moving. The defect correcting unit 330 corrects the pixel value of the defective phase difference detecting pixel in the image after moving based on the focusing determination result information, from the pixel value in the image before moving the image by the defocus amount indicated by the focusing determination result information. That is, the pixel value corresponding to the pixel value of the defective phase difference detecting pixel is detected from the image (distribution data 461) before moving (image capturing data ((n−1)-th)) on the basis of the defocus amount (arrow 430), and considers the detected pixel value as the pixel value of the defective phase difference detecting pixel.

Figure 3D:
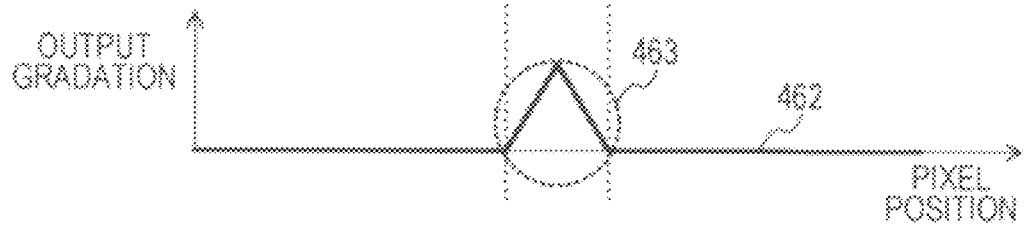

FIG. 3D shows distribution data in which the pixel value of the defective pixel 450 in the distribution data 462 shown in FIG. 3C is corrected. FIG. 3D shows the pixel value of the defective pixel 450 corrected as shown in FIG. 3C by a thick solid line in a perimeter 463.

As described above, according to the defect correcting unit 330, it is possible to correct the pixel value of the defective phase difference detecting pixel on the basis of the before-driving defective side pixel value, the correction target defective side pixel value supplied from the signal processing unit 140, the defective pixel information, and the focusing determination result information.

In FIG. 3A to FIG. 3D, the description is performed without considering that the image becomes drastically blurry when the focus further deviates. Actually, since the image (edge) becomes drastically blurry (the pixel value is decreased) as the focus drastically deviates, the pixel value of the edge is decreased according to the magnitude of the defocus amount. A coefficient (determined in advance in a step of producing the image capturing device 100) for correcting the decrease of the pixel value is stored in the defect correcting unit 330, the pixel value to be the pixel value of the defective phase difference detecting pixel is multiplied by the coefficient to correct the pixel value, and thus it is possible to further improve precision in correction.

Example of Phase Difference Detection

Figure 4A:
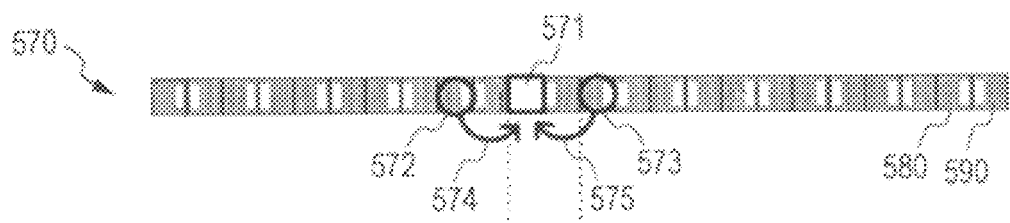
FIG. 4A to FIG. 4C are schematic diagrams illustrating an example of phase difference detection based on data obtained by correcting a defective phase difference detecting pixel in the first embodiment of the present disclosure, and an example of phase difference detection based on correction of a defective phase difference detecting pixel in the image capturing device of the related art.
Figure 4B:
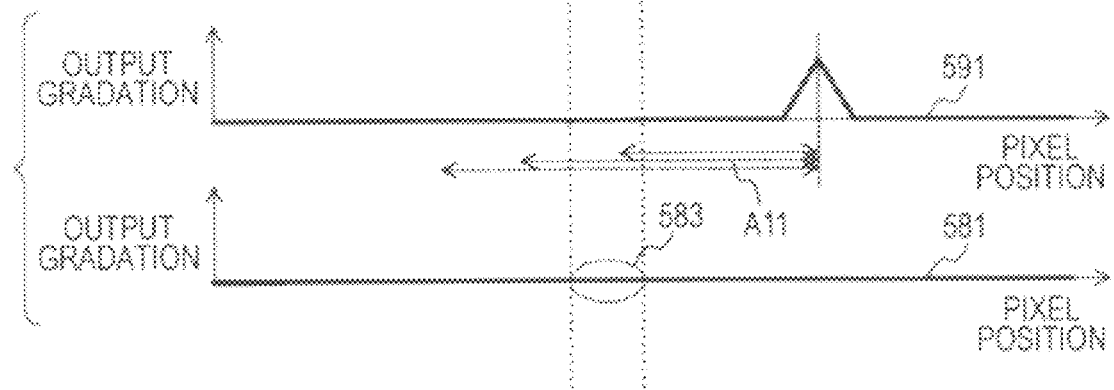
Figure 4C:
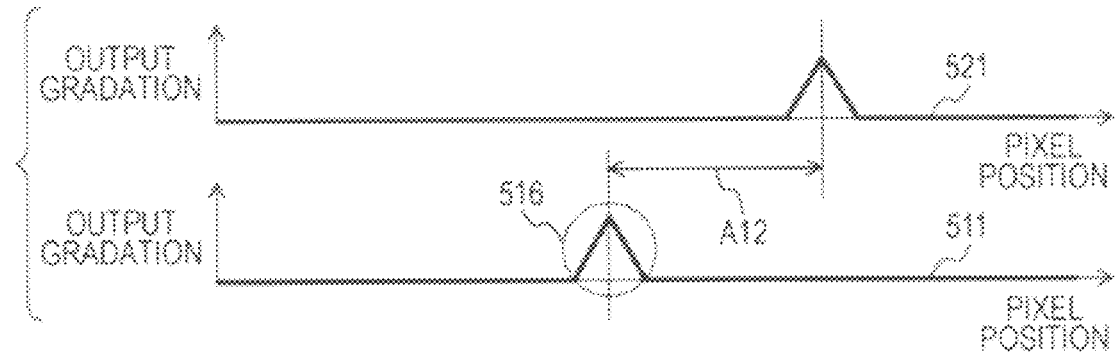

FIG. 4A to FIG. 4C are schematic diagrams illustrating an example of the phase difference detection based on the data obtained by correcting the pixel value of the defective phase difference detecting pixel in the first embodiment of the present disclosure, and an example of the phase difference detection based on the correction of the pixel value of the defective phase difference detecting pixel in the image capturing device of the related art.

In FIG. 4A to FIG. 4C, it is assumed that there is an edge at the position of the defective phase difference detecting pixel.

In FIG. 4A and FIG. 4B, an example of the phase difference detection based on the correction of the pixel value of the defective phase difference detecting pixel in the image capturing device of the related art is schematically shown. In FIG. 4A, the correction of the pixel value of the defective phase difference detecting pixel in the image capturing device of the related art is schematically shown with the pixel disposition. A pixel area 570, right opening phase difference detecting pixels 580, left opening phase difference detecting pixels 590, and a defective pixel 571 shown in FIG. 4A correspond to the pixel area 440, the right opening phase difference detecting pixel 460, and the like shown in FIG. 3B, respectively, and thus the description thereof is not repeated.

In FIG. 4A, the phase difference detecting pixels referring to the pixel values for correction of the pixel value of the defective phase difference detecting pixel are shown by the phase difference detecting pixels (right opening phase difference detecting pixels 572 and 573) indicated by thick-line circles. FIG. 4A schematically shows that the pixel value of the defective pixel 571 is corrected on the basis of the pixel values of the right opening phase difference detecting pixels 572 and 573 by an arrow 574 and an arrow 575.

As shown in FIG. 4A, in the correction of the pixel value of the defective phase difference detecting pixel in the image capturing device of the related art, for example, the pixel value of the defective phase difference detecting pixel is corrected using an average value of the pixel values of the same adjacent phase difference detecting pixels (right opening phase difference detecting pixels 572 and 573).

FIG. 4B shows distribution data (distribution data 591 and distribution data 581) generated by the correction of the pixel value of the defective phase difference detecting pixel shown in FIG. 4A. The distribution data 591 is distribution data generated on the basis of the pixel values of the left opening phase difference detecting pixels 590, and the distribution data 581 is distribution data generated on the basis of the pixel values of the right opening phase difference detecting pixels 580. FIG. 4B shows the pixel value of the defective pixel 571 corrected by the average value of the pixel values of the right opening phase difference detecting pixels 572 and 573 shown in FIG. 4A, by a thick solid line in a perimeter 583.

In the correction of the pixel value of the defective pixel 571 according to the method of correcting the pixel value of the defective phase difference detecting pixel of the related art, the average value of the pixel values (output gradation) of the right opening phase difference detecting pixels 572 and 573 is the pixel value of the defective pixel 571 as shown in FIG. 4A. That is, when the output gradation of the right opening phase difference detecting pixels 572 and 573 is "0", the pixel value of the defective pixel 571 is "0". When the correction is performed when there is an edge in the defective pixel 571, the pixel value of the defective pixel 571 is not accurately corrected. Accordingly, two edges for measuring the distance in the phase difference detection are not detected (see the distance A11 in FIG. 4B), and there is a problem that the phase difference detection is not accurately performed.

FIG. 4C schematically shows an example of phase difference detection after correction of the pixel values of the defective phase difference detecting pixel by the defect correcting unit 330 in the first embodiment of the present disclosure.

FIG. 4C shows distribution data (distribution data 521) generated on the basis of the pixel values of the left opening phase difference detecting pixels (see the left opening phase difference detecting pixels 470 in FIG. 3B). FIG. 4C shows distribution data (distribution data 511) generated on the basis of the pixel values of the right opening phase difference detecting pixels (see the right opening phase difference detecting pixels 460 in FIG. 3B).

FIG. 4C shows a distance (distance A12) between an edge of the distribution data 521 and an edge of the distribution data 511. FIG. 4C shows the pixel value of the defective phase difference detecting pixel corrected as shown in FIG. 3C, by a thick solid line in a perimeter 516.

As shown by the distance A12, according to the correction of the first embodiment of the present disclosure, when the position of the defective phase difference detecting pixel is the edge, the pixel value of the defective phase difference detecting pixel is corrected using the pixel values of the pair of phase difference detecting pixels, and thus it is possible to appropriately perform the phase difference detection.

Example of Operation of Image Capturing Device

Next, the operation of the image capturing device 100 in the first embodiment of the present disclosure will be described with reference to the drawings.

FIG. 5 is a flowchart illustrating an example of a sequence of an image capturing process when the correction of the defective phase difference detecting pixel is performed by the image capturing device 100 in the first embodiment of the present disclosure.

First, the control unit 130 determines whether or not the user instructs starting of an image capturing operation for capturing an image (Step S901). When it is determined that the user does not instruct starting of the image capturing operation for capturing the image (Step S901), the image capturing process sequence is ended.

Meanwhile, when it is determined that the user instructs starting of the image capturing operation for capturing the image (Step S901), the comparison range for calculating the defocus amount for the focusing target object is set by the phase difference detecting unit 160 (Step S902). An image of the photography subject is captured, and the captured image is acquired by the image capturing element 200 (Step S903).

Subsequently, a defect correcting process of correcting the defective phase difference detecting pixel in the comparison range is performed by the defect correcting unit 330 (Step S910). The defect correcting process (Step S910) will be described with reference to FIG. 6. Step S910 is an example of a detection sequence and a correction sequence described in Claims.

Thereafter, a phase difference detecting process of calculating the defocus amount (focusing determination result information) based on the phase difference detection is performed by the phase difference detecting unit 160 (Step S904). The focus lens 113 is driven by the driving unit 170, and a focusing process of focusing on the focusing target object is performed (Step S905).

Then, the control unit 130 determines whether or not the shutter button in the operation receiving unit 120 is pressed (Step S906). When it is determined that the shutter button is not pressed (Step S906), the process proceeds to Step S909.

Meanwhile, when it is determined that the shutter button is pressed (Step S906), subsequently, a still image is captured by the image capturing element 200 (Step S907). The still image subjected to the signal process by the image generating unit 150 is stored in the storage unit 152 (Step S908).

Then, the control unit 130 determines whether or not the user instructs ending of the image capturing operation for capturing the still image (Step S909). When it is determined that the user does not instruct ending of the image capturing operation for capturing the still image (Step S909), the process returns to Step S902.

Meanwhile, when it is determined that the user instructs ending of the image capturing operation for capturing the still image (Step S909), the image capturing process sequence is ended.

FIG. 6 is a flowchart illustrating an example of a sequence of the defect correcting process (Step S910) in the operation of the image capturing process of the first embodiment of the present disclosure.

First, the defect correcting unit 330 determines whether or not there is a defective phase difference detecting pixel in the phase difference detecting pixels in the range (comparison range) of detecting the phase difference, using the defective pixel information supplied from the defective pixel information storing unit 310 (Step S921). When it is determined that there is no defective phase difference detecting pixel in the comparison range (Step S911), the defect correcting process sequence is ended.

Meanwhile, when it is determined that there is a defective phase difference detecting pixel in the comparison range (Step S911), the defocus amount (focusing determination result information) relating to the driving of the lens just before the image capturing relating to the correction target pixel value is acquired by the defect correcting unit 330 (Step S912).

Then, the before-driving defective side pixel value, which is the pixel value (before-driving pixel value) in the previous image capturing in time series of the correction target pixel value and which is each pixel value of the phase difference detecting pixel in which the same side as the defective phase difference detecting pixel is opened, is acquired from the defective side pixel value storing unit 320 (Step S913). The pixel value of the defective phase difference detecting pixel is corrected on the basis of the defocus amount and the before-driving defective side pixel value (Step S914).

Thereafter, the before-driving defective side pixel value stored in the defective side pixel value storing unit 320 is updated by the defective side pixel value of the correction target pixel values (Step S915), and the defect correcting process sequence is ended.

As described above, according to the first embodiment of the present disclosure, the correction is performed from the defocus amount and the pixel value of the phase difference detecting pixels in the image data (image data previous by one frame) by previous image capturing of the correction target image data, and thus it is possible to improve precision in correction. Since the defocus amount calculated when calculating the driving amount of the focus lens in auto focus is used as the defocus amount, it is not necessary to newly calculate the defocus amount, and thus it is possible to rapidly perform the correction.

When the decrease of the pixel value according to the magnitude of the defocus amount described with reference to FIG. 3A to FIG. 3D is corrected, the pixel value detected as the pixel value of the defective phase difference detecting pixel is corrected by the correction coefficient in Step S914, and the corrected pixel value is the pixel value of the defective phase difference detecting pixel.

2. Second Embodiment

In the first embodiment of the present disclosure, the example in which the movement amount of the image is calculated from the focusing determination result information (defocus amount) calculated using the image capturing data ((n−1)-th) and the pixel value of the defective phase difference detecting pixel in the image capturing data (n-th) is corrected using the calculated movement amount has been described. Since the defocus amount has been calculated in advance at the time of the focusing determination, it is not necessary to newly calculate the defocus amount at the time of correction. For this reason, in the first embodiment of the present disclosure, it is possible to rapidly perform the correction.

However, the defocus amount does not include information about an event generated from the image capturing of the image capturing data ((n−1)-th) to the image capturing of the image capturing data (n-th), and thus the precision in correction may deteriorate. Accordingly, it is necessary to raise the precision in correction by performing correction considering the event generated from the image capturing of the image capturing data ((n−1)-th) to the image capturing of the image capturing data (n-th).

In the second embodiment of the present disclosure, an example of calculating the movement amount of the image using each pixel value (opposite side pixel value) of the phase difference detecting pixels in which the opposite side to the defective phase difference detecting pixel is opened will be described with reference to FIG. 7 to FIG. 9.

Example of Functional Configuration of Image Capturing Device

Figure 7:
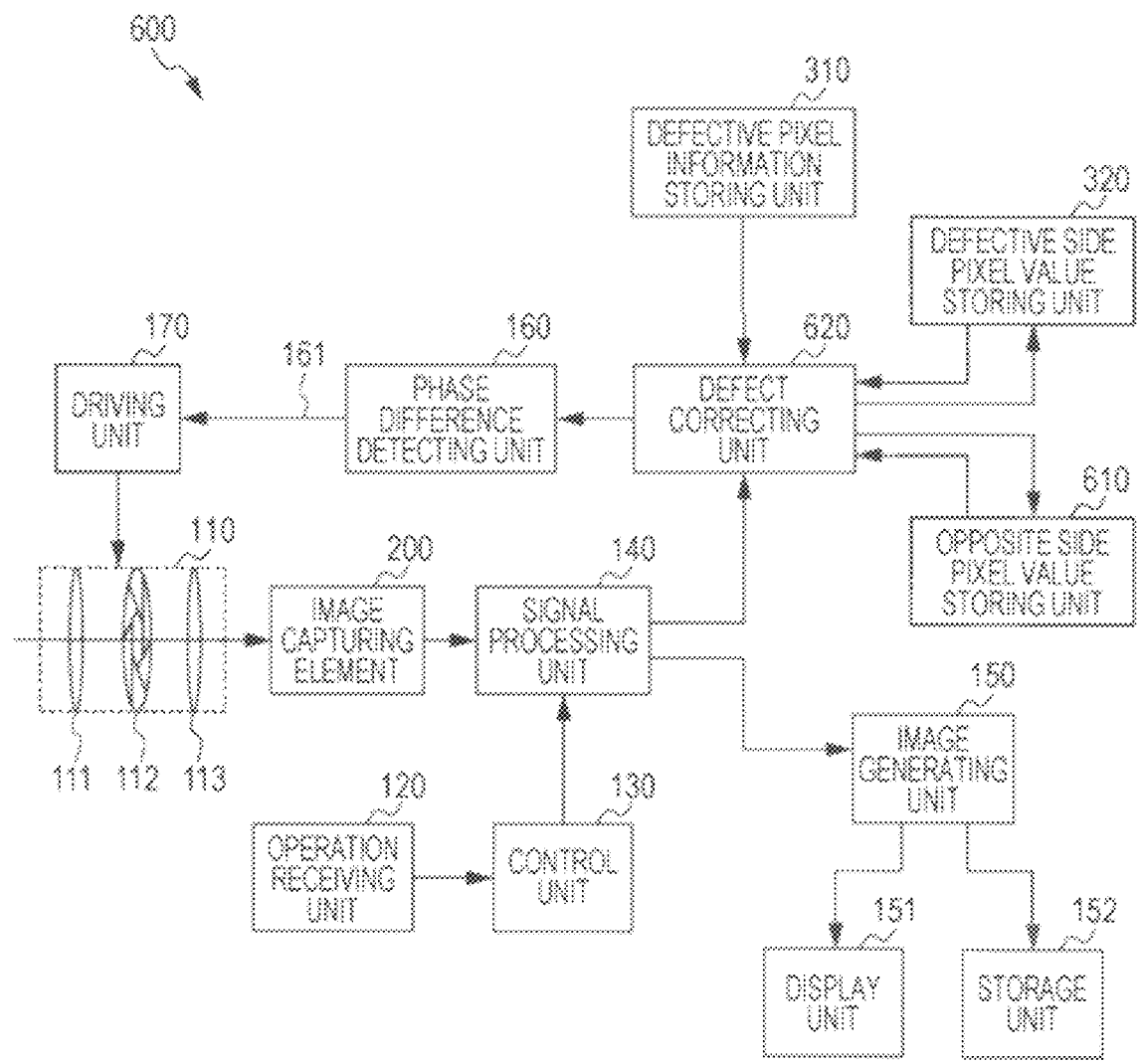
FIG. 7 is a block diagram illustrating an example of a functional configuration of an image capturing device in a second embodiment of the present disclosure.

FIG. 7 is a block diagram illustrating an example of a functional configuration of an image capturing device 600 in the second embodiment of the present disclosure. The image capturing device 600 is a modified example of the image capturing device 100 shown in FIG. 1, includes a defect correcting unit 620 instead of the defect correcting unit 330 of the image capturing device 100, and further includes an opposite side pixel value storing unit 610. Since the configuration other than the defect correcting unit 620 and the opposite side pixel value storing unit 610 is the same as the configuration shown in FIG. 1, the same reference numerals and signs are given and the description is not repeated herein.

The opposite side pixel value storing unit 610 stores the pixel value (opposite side pixel value) of the phase difference detecting pixel, in which the opposite side to the defective phase difference detecting pixel is opened, of the pixel values generated in the image capturing earlier in time series than the image capturing of the pixel value corrected by the defect correcting unit 330. That is, the opposite side pixel value storing unit 610 stores the pixel value (before-driving opposite side pixel value) forming a pair with the before-driving defective side pixel value stored in the defective side pixel storing unit 320. The before-driving opposite side pixel value stored in the opposite side pixel value storing unit 610 is updated by the opposite side pixel value of the image data considered as the correction target when the pixel value of the defective phase difference detecting pixel is corrected by the defect correcting unit 330. The opposite side pixel value storing unit 610 supplies the stored before-driving opposite side pixel value to the defect correcting unit 620.

The defect correcting unit 620 corrects the pixel value of the defective phase difference detecting pixel in the same manner as the defect correcting unit 330 described with reference to FIG. 1. The defect correcting unit 620 calculates the movement amount for correcting the defective phase difference detecting pixel on the basis of the before-driving opposite side pixel value stored in the opposite side pixel value storing unit 610 and the opposite side pixel value supplied from the signal processing unit 140. The defect correcting unit 620 corrects the pixel value of the defective phase difference detecting pixel on the basis of the calculated movement amount and the before-driving defective side pixel value. When the correction of the pixel value of the defective phase difference detecting pixel is completed, the defect correcting unit 620 updates the before-driving defective side pixel value stored in the defective side pixel value storing unit 320 and the before-driving opposite side pixel value stored in the opposite side pixel value storing unit 610. The correction performed by the defect correcting unit 620 will be described with reference to FIG. 8A to FIG. 8D.

Example of Correction of Pixel Value of Defective Phase Difference Detecting Pixel in Defect Correcting Unit FIG. 8A to FIG. 8D are schematic diagrams illustrating an example of the pixel value of the defective phase difference detecting pixel by the defect correcting unit 620 in the second embodiment of the present disclosure.

In FIG. 8A to FIG. 8D, it is assumed that there is an edge in the position of the defective phase difference detecting pixel.

Figure 8A:
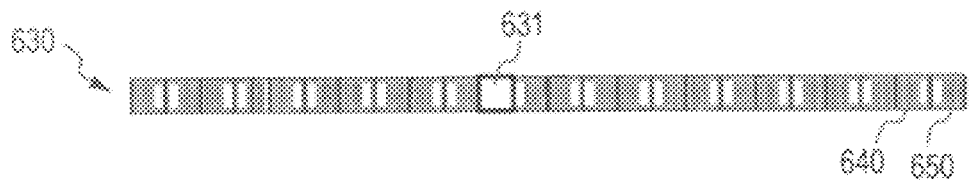
FIG. 8A to FIG. 8D are diagrams illustrating an example of correction of a pixel value of a defective phase difference detecting pixel by a defect correcting unit in the second embodiment of the present disclosure.
Figure 8B:
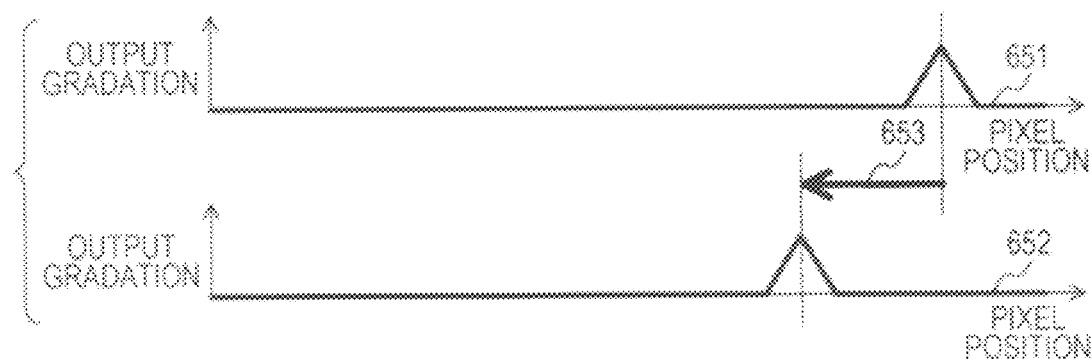
Figure 8C:
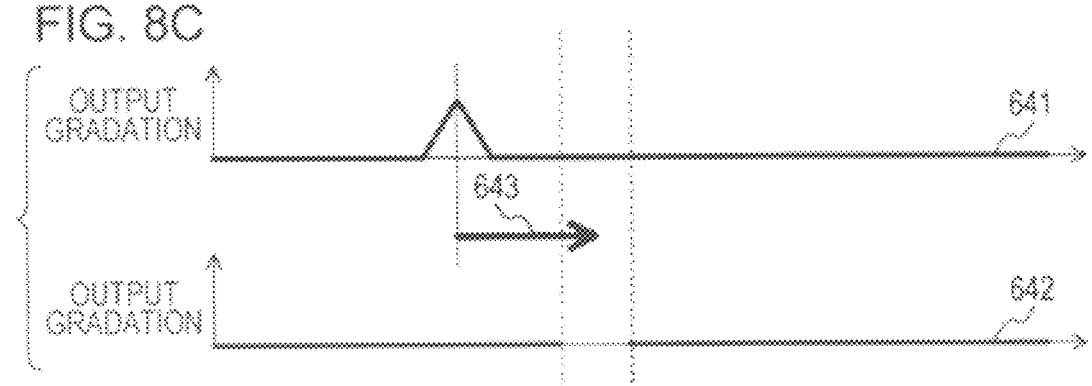
Figure 8D:
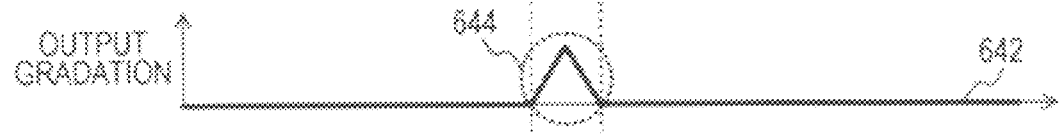

FIG. 8A shows a comparison range (comparison range 630) including one defective phase difference detecting pixel. FIG. 8B to FIG. 8D show distribution data of the pixel values of the phase difference detecting pixels in the comparison range 630. The comparison range 630, right opening phase difference detecting pixels 640, left opening phase difference detecting pixels 650, and a defective pixel 631 shown in FIG. 8A correspond to the pixel area 440, the right opening phase difference detecting pixel 460, and the like shown in FIG. 3B, respectively, and thus the description thereof is not repeated.

FIG. 8B shows distribution data (distribution data 652) relating to the pixel values of the left opening phase difference detecting pixels 650 in the comparison range 630 of the correction target image capturing data (n-th). FIG. 8B shows distribution data (distribution data 651) relating to the pixel values of the left opening phase difference detecting pixels 650 in the comparison range 630 of the previous image capturing data ((n−1)-th) of the correction target image data (n-th). FIG. 8B shows the movement amount of the image between the distribution data 651 and the distribution data 652, by an arrow 653 extending from the center of the edge of the distribution data 651 to the center of the edge of the distribution data 652.

Hereinafter, the calculation of the movement amount of the image in the correction of the defective phase difference detecting pixel by the defect correcting unit 620 will be described.

The defect correcting unit 620 calculates the movement amount for correcting the defective phase difference detecting pixel on the basis of the movement amount of the image between the distribution data of the opposite side pixel value in the correction target image capturing data (n-th) and the distribution data of the opposite side pixel value (before-driving opposite side pixel value) in the previous image capturing data ((n−1)-th). That is, the information corresponding to the defocus amount in the first embodiment of the present disclosure is calculated using the distribution data of the opposite side pixel value. Accordingly, in the same manner as the defect correcting unit 330 of the first embodiment of the present disclosure, it is possible to correct the pixel value of the defective phase difference detecting pixel after driving the focus lens, from the defective side pixel value before driving the focus lens.

FIG. 8C shows distribution data (distribution data 642) relating to the pixel values of the right opening phase difference detecting pixels 640 in the comparison range 630 of the correction target image capturing data (n-th). FIG. 8C shows distribution data (distribution data 641) relating to the pixel values of the right opening phase difference detecting pixels 640 in the comparison range 630 of the image capturing data ((n−1)-th). FIG. 8C shows the movement of the image by an arrow 643 extending from the center of the edge of the distribution data 641 to the center of the area (part where there is no thick solid line of the distribution data 642) of the defective phase difference detecting pixel of the distribution data 642.

Hereinafter, the correction of the pixel value of the defective phase difference detecting pixel performed by the defect correcting unit 620 will be described.

As shown in FIG. 8B, the defect correcting unit 620 calculates the movement amount (the arrow 653 in FIG. 8B) of the image from the distribution data of the pair of phase difference detecting pixels (left opening phase difference detecting pixels 650) of the defective phase difference detecting pixel.

In the phase difference detection, the movement direction of the image in the distribution data of the right opening phase difference detecting pixels 640 including the defective phase difference detecting pixel is the opposite side to the movement direction of the image of the left opening phase difference detecting pixels 650. In the phase difference detection, an absolute value of the movement amount of the image in the distribution data of the right opening phase difference detecting pixels 640 and an absolute value of the movement amount of the image in the distribution data of the left opening phase difference detecting pixels 650 are the same. That is, the movement amount (arrow 643) of the image in the distribution data of the right opening phase difference detecting pixels 640 is calculated by reversing the movement direction of the movement amount (arrow 653) of the image acquired from the distribution data of the right opening phase difference detecting pixels 640.

The defect correcting unit 620 detects the pixel value corresponding to the pixel value of the defective phase difference detecting pixel using the movement amount (arrow 643) from the distribution data 641 of the image capturing data ((n−1)-th), and corrects the pixel value of the defective phase difference detecting pixel on the basis of the detected pixel value.

FIG. 8D shows distribution data in which the pixel value of the defective pixel 631 in the distribution data 642 shown in FIG. 8C is corrected. FIG. 8D shows the pixel value of the defective pixel 631 corrected as shown in FIG. 8C, by a thick solid line in a perimeter 644.

Example of Operation of Image Capturing Device

Next, the operation of the image capturing device 600 in the second embodiment of the present disclosure will be described with reference to the drawings.

An example of a sequence of an image capturing process when performing correction of the pixel value of the defective phase difference detecting pixel by the image capturing device 600 is the same as the example of the image capturing device 100 shown in FIG. 5, and thus the description is not repeated herein.

Figure 9:
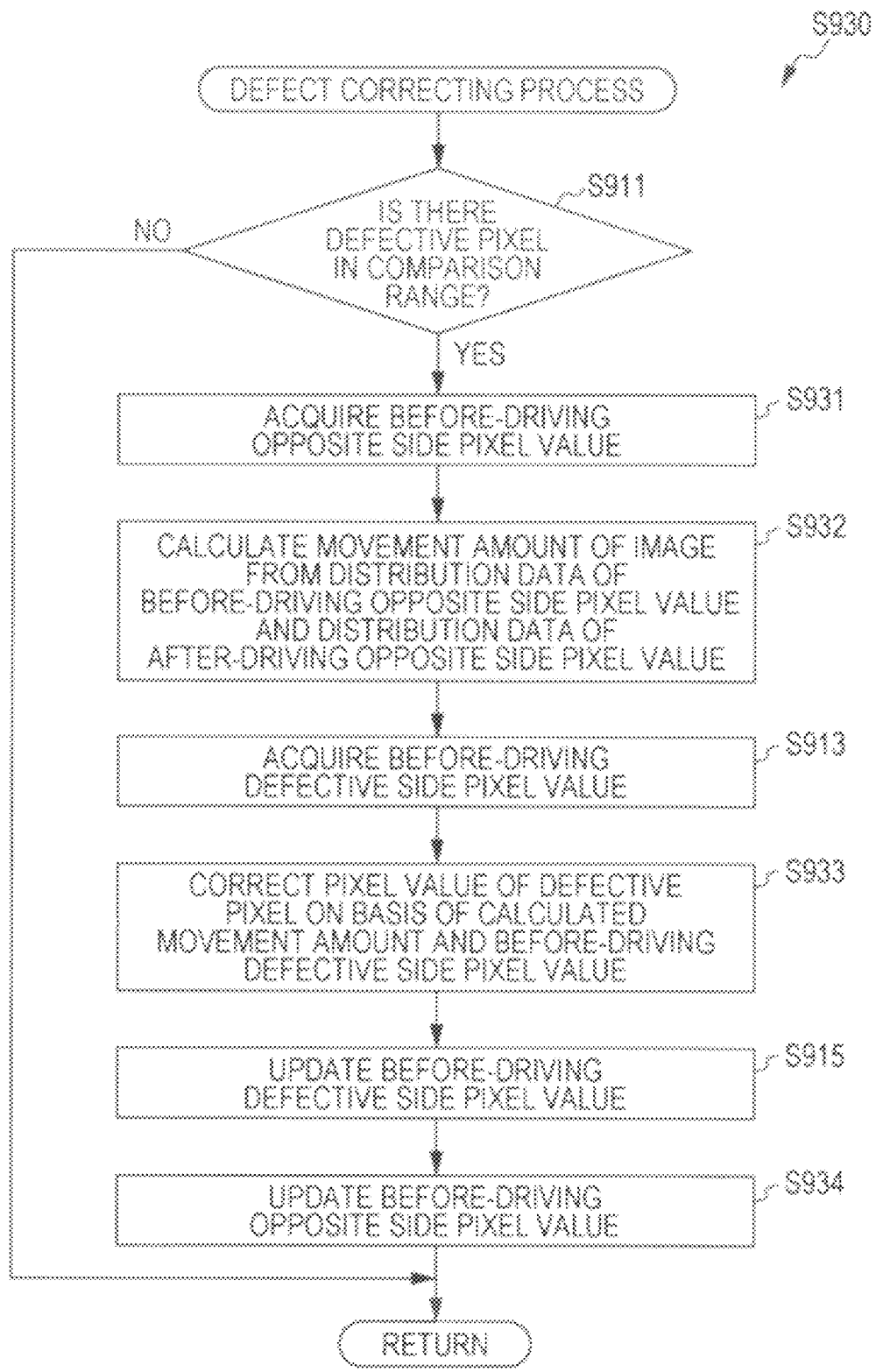
FIG. 9 is a flowchart illustrating an example of a sequence of a defect correcting process (Step S930) in an image capturing process operation of the second embodiment of the present disclosure.

FIG. 9 is a flowchart illustrating an example of a sequence of a defect correcting process (Step S930) in the operation of the image capturing process of the second embodiment of the present disclosure. The defect correcting process (Step S930) is a modified example of the defect correcting process (Step 910) of the first embodiment of the present disclosure shown in FIG. 6. The same reference numerals and signs are given to the same process as the process of the defect correcting process (Step S910), and a part of the description is not repeated.

When it is determined that there is a defective phase difference detecting pixel in the comparison range (Step S911), the before-driving opposite side pixel value is acquired from the opposite side pixel value storing unit 610 (Step S931). The movement amount of the image of the opposite side is calculated on the basis of the distribution data of the before-driving opposite side pixel value and the distribution data of the after-driving opposite side pixel value (Step S932), and the process proceeds to Step S913.

When the before-driving defective side pixel value is acquired (Step S913), the pixel value of the defective phase difference detecting pixel is corrected on the basis of the calculated movement amount and the distribution data of the before-driving defective side pixel value (Step S933).

When the before-driving defective side pixel value is updated (Step S915), the before-driving opposite side pixel value is updated (Step S934), and the sequence of the defect correcting process is completed. Any of Step S915 and Step S934 may be the former.

As described above, according to the second embodiment of the present disclosure, the movement amount of the image relating to the defective side pixel value is calculated on the basis of the before-driving opposite side pixel value and the after-driving opposite side pixel value of the focus lens, and it is possible to perform the correction using the calculated movement amount. Accordingly, it is possible to perform the correction considering the change of the photography system from the image capturing of the image capturing data ((n−1)-th) to the image capturing of the image capturing data (n-th), and thus it is possible to improve precision in correction.

3. Third Embodiment

In the first and second embodiments of the present disclosure, it is considered that the precision in correction of the defective phase difference detecting pixel is decreased when the photography subject is a moving object. That is, it is necessary to raise the precision in correction of the defective phase difference detecting pixel when the photography subject moves.

In the third embodiment of the present disclosure, an example of performing correction using the driving amount of the lens and the movement amount of the image will be described with reference to FIG. 10A to FIG. 13.

Example of Transition of Photography Subject included in Image Capturing Range

FIG. 10A and FIG. 10B are schematic diagrams illustrating an example of a photography subject included in an image capturing range.

FIG. 10A schematically shows an image (image 710) relating to previous image capturing data ((n−1)-th) of the correction target image data (n-th), and FIG. 10B schematically shows an image (image 720) relating to image capturing data (n-th).

In the image 710 and the image 720, a person 715 and a person 725 are shown as a focusing target object. In the image 720, the movement of the person is represented by representing the position of the person 715 of the image 710 by a dotted line and representing a distance between the position of the person 715 represented by the dotted line and the position of the person 725 by an arrow (arrow 730).

As described above, when the focusing target object is moved, the correction method described in the first and second embodiments of the present disclosure, it is considered that the precision is decreased.

Example of Function Configuration of Image Capturing Device

Figure 11:
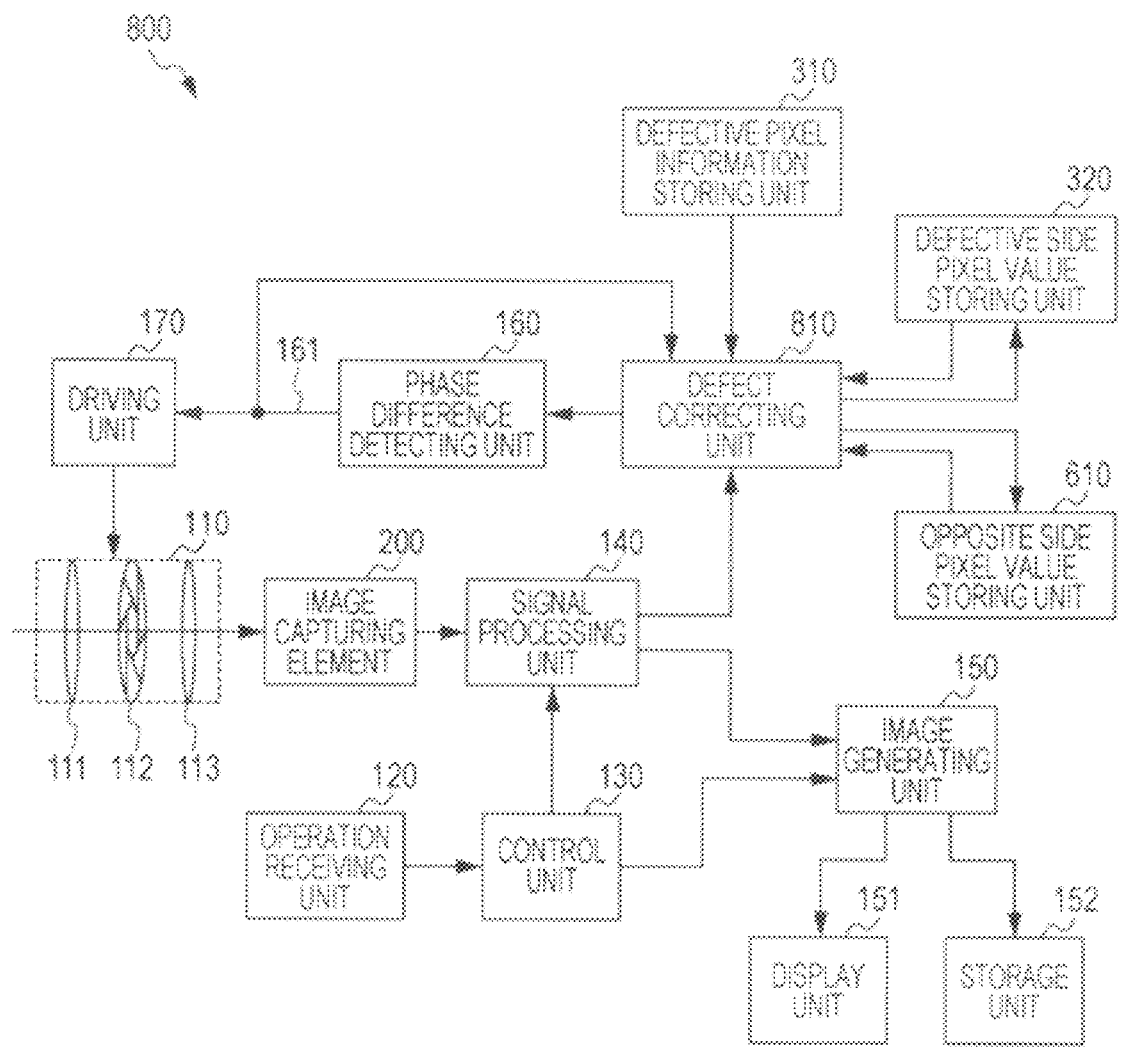
FIG. 11 is a block diagram illustrating an example of a functional configuration of an image capturing device of a third embodiment of the present disclosure.

FIG. 11 is a block diagram illustrating a functional configuration of an image capturing device 800 in the third embodiment of the present disclosure. The image capturing device 800 is a modified example of the image capturing device 100 shown in FIG. 1 and the image capturing device 600 shown in FIG. 7, includes a defect correcting unit 810 instead of the defect correcting unit 330 of the image capturing device 100, and further includes an opposite side pixel value storing unit 610. Since the configuration other than the defect correcting unit 810 is the same as the configuration shown in FIG. 1 and FIG. 7, the same reference numerals and signs are given and the description is not repeated herein.

The defect correcting unit 810 corrects the pixel value of the defective phase difference detecting pixel in the same manner as the defect correcting unit 330 shown in FIG. 1 and the defect correcting unit 620 shown in FIG. 7. The defect correcting unit 620 calculates the movement amount of the image by the driving of the focus lens on the basis of the focusing determination result information (defocus amount) supplied from the phase difference detecting unit 160 in the same manner as the defect correcting unit 330. The defect correcting unit 810 calculates the movement amount of the image of the opposite side pixel value on the basis of the before-driving opposite side pixel value and the opposite side pixel value of the pixel values supplied from the signal processing unit 140 in the same manner as the defect correcting unit 620. The defect correcting unit 810 calculates a deviation amount of the photography subject of the defective phase difference detecting pixel on the basis of the movement amount of the image of the opposite side pixel value calculated from the defocus amount and the movement amount of the image calculated from the opposite side pixel value.

Thereafter, the defect correcting unit 810 corrects the pixel value of the defective phase difference detecting pixel on the basis of the calculated deviation amount of the photography subject and the movement amount of the image calculated from the opposite side pixel value. When the correction of the pixel value of the defective phase difference detecting pixel is completed, the defect correcting unit 810 updates the before-driving defective side pixel value and the before-driving opposite side pixel value in the same manner as the defect correcting unit 620. The correction performed by the defect correcting unit 810 will be described with reference to FIG. 12A to FIG. 12D.

Example of Correction of Pixel Value of Defective Phase Difference Detecting Pixel in Defect Correcting Unit

FIG. 12A to FIG. 12D show an example of the pixel value of the defective phase difference detecting pixel by the defect correcting unit 810 in the third embodiment of the present disclosure.

In FIG. 12A to FIG. 12D, it is assumed that there is an edge in the position of the defective phase difference detecting pixel.

Figure 12A:
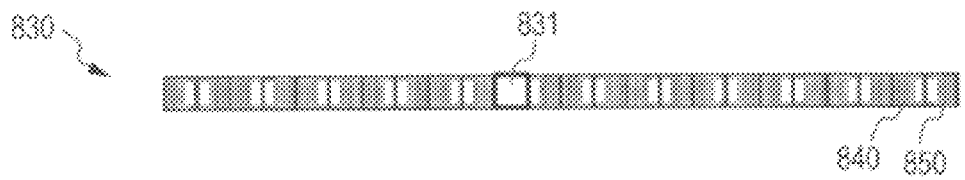
FIG. 12A to FIG. 12D are diagrams illustrating an example of correction of a pixel value of a defective phase difference detecting pixel by a defect correcting unit in the third embodiment of the present disclosure.
Figure 12B:
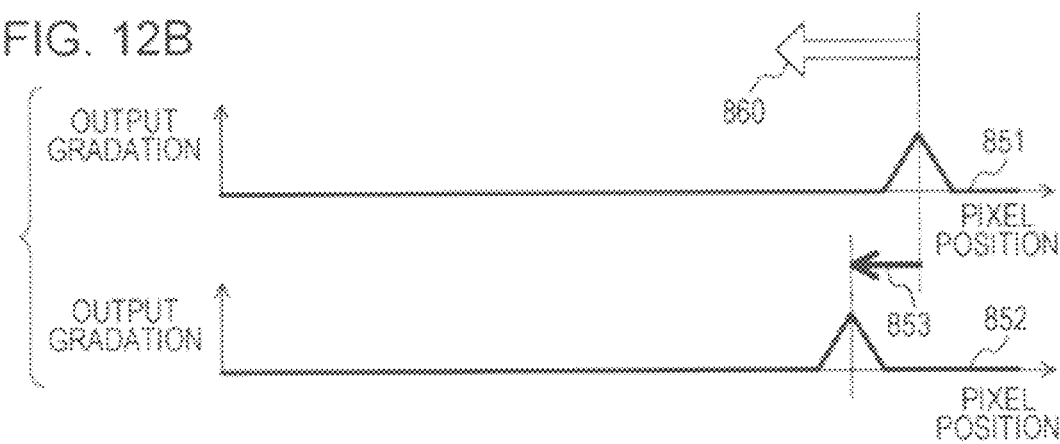
Figure 12C:
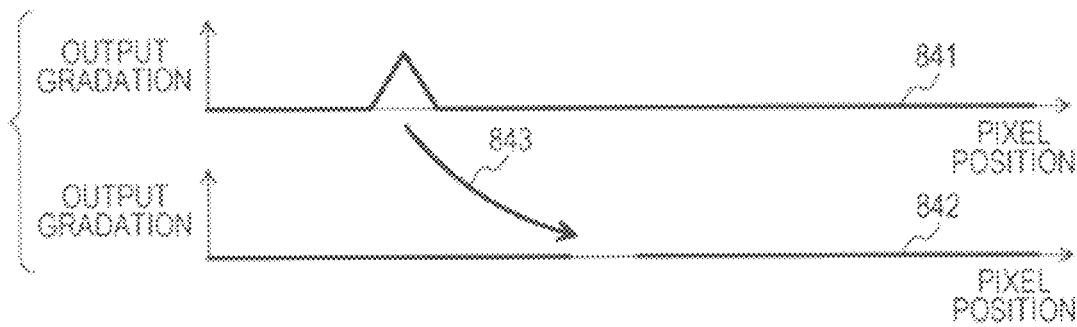
Figure 12D:
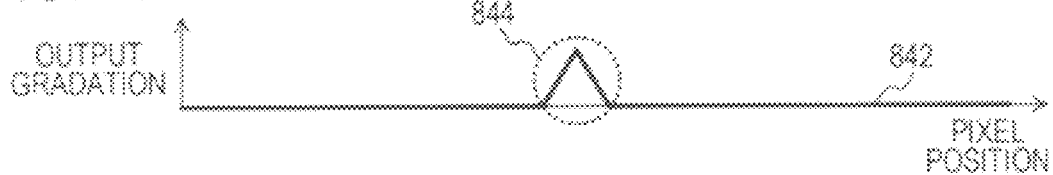

FIG. 12A shows an area of the phase difference detecting pixels generating the pixel values of distribution data shown in FIG. 12B to FIG. 12D, and shows a comparison range (comparison range 830) including one defective phase difference detecting pixel. Since the comparison range 830 corresponds to the comparison range shown in FIG. 3B and FIG. 8A, the description is not repeated herein. In FIG. 12A, as shown in the comparison range 830, it is assumed that the eleventh phase difference detecting pixel (right opening phase difference detecting pixel) from the left side is the defective pixel (defective pixel 831).

FIG. 12B shows distribution data (distribution data 852) relating to the pixel values of the left opening phase difference detecting pixels 850 in the comparison range 830 of the correction target image capturing data (n-th). FIG. 12B shows distribution data (distribution data 851) relating to the pixel values of the left opening phase difference detecting pixels 850 in the comparison range 830 of the previous image capturing data ((n−1)-th) of the correction target image data (n-th).

FIG. 12B shows an arrow (arrow 860) representing the defocus amount relating to the driving amount of the lens between the image capturing data ((n−1)-th) and the image capturing data (n-th). That is, the arrow 860 is the defocus amount (focusing determination result information) calculated by the phase difference detecting unit 160 on the basis of the pixel value of the phase difference detecting pixel of the image capturing data ((n−1)-th). The arrow 860 represents the movement amount of the image (edge) of the left opening phase difference detecting pixels 850 estimated from the driving amount of the lens, and FIG. 12B shows that the lens is driven to shift the edge to the left by two pixels.

Furthermore, FIG. 12B shows the movement amount of the image calculated from the comparison between the distribution data 851 and the distribution data 852, by an arrow 853 extending from the center of the edge of the distribution data 851 to the center of the edge of the distribution data 852. The arrow 853 represents that the image of the left opening phase difference detecting pixels 850 is shifted to the left by one pixel between the image capturing data ((n−1)-th) and the image capturing data (n-th).

FIG. 12C shows distribution data (distribution data 842) relating to the pixel values of the right opening phase difference detecting pixels 840 in the comparison range 830 of the correction target image capturing data (n-th). In addition, FIG. 12C shows distribution data (distribution data 841) relating to the pixel values of the right opening phase difference detecting pixels 840 in the comparison range 830 of the previous image capturing data ((n−1)-th) of the image capturing data (n-th). Furthermore, FIG. 12C shows the movement amount of the image of the defective phase difference detecting pixel, by an arrow 843 extending from the center of the edge of the distribution data 841 to the center of the area (part where there is no thick solid line of the distribution data 842) representing the pixel value of the defective phase difference detecting pixel of the distribution data 842.

Herein, the correction of the pixel value of the defective phase difference detecting pixel by the defect correcting unit 810 will be described with reference to FIG. 12B and FIG. 12C.

First, the defect correcting unit 810 calculates the defocus amount (arrow 860) relating to the image of the left opening phase difference detecting pixels 850 on the basis of the focusing determination information supplied from the phase difference detecting unit 160. The defect correcting unit 810 calculates the movement amount (arrow 853) of the image of the left opening phase difference detecting pixels 850 on the basis of the before-driving opposite side pixel value from the opposite side pixel value storing unit 610 and the pixel values of left opening phase difference detecting pixels 850 from the signal processing unit 140.

The defect correcting unit 810 calculates the deviation amount of the photography subject of the defective phase difference detecting pixel from the difference between the movement amount of the image calculated from the defocus amount (arrow 860) and the movement amount (arrow 853) calculated from the pixel values of the left opening phase difference detecting pixels 850. That is, as shown in FIG. 12B, when the movement amount estimated from the driving amount of the lens is shifted to the left by two pixels and the movement amount of the image estimated from the pixel values is shifted to the left by one pixel, the defect correcting unit 810 calculates that the photography subject is shifted to the right by one pixel.

Thereafter, the defect correcting unit 810 calculates the movement amount of the image of the defective phase difference detecting pixel side on the basis of the deviation amount of the photography subject of the defective phase difference detecting pixel and the movement amount calculated from the pixel values of the left opening phase difference detecting pixels 850. When the photography subject is shifted to the right by one pixel and the driving amount of the lens relating to the right opening phase difference detecting pixels is shifted to the right by two pixels (the direction is reversed to that of the left opening phase difference detecting pixels), the image of the right opening phase difference detecting pixels is shifted to the right by three pixels. That is, as shown in FIG. 12C, the pixel value of the defective pixel 831 is corrected using the pixel value at the position shifted from the position of the defective pixel 831 to the left position by three pixels.

FIG. 12D shows distribution data in which the pixel value of the defective pixel 831 in the distribution data 842 shown in FIG. 12C is corrected. FIG. 12D shows the pixel value of the defective pixel 831 corrected as shown in FIG. 12C by distribution data of a thick solid line shown in a perimeter 844.

Example of Operation of Image Capturing Device

Next, the operation of the image capturing device 800 in the third embodiment of the present disclosure will be described with reference to the drawings.

An example of a sequence of an image capturing process when performing correction of the pixel value of the defective phase difference detecting pixel by the image capturing device 800 is the same as the example of the image capturing device 100 shown in FIG. 5, and thus the description is not repeated herein.

FIG. 13 is a flowchart illustrating an example of a sequence of a defect correcting process (Step S940) in the operation of the image capturing process of the third embodiment of the present disclosure. The defect correcting process (Step S940) is a modified example of the defect correcting process (Step S930) of the second embodiment of the present disclosure shown in FIG. 9. The same reference numerals and signs are given to the same process as the process of the defect correcting process (Step S930), and a part of the description is not repeated.

When the movement amount of the image of the opposite side is calculated on the basis of the distribution data of the before-driving opposite side pixel value and the distribution data of the after-driving opposite side pixel value (Step S932), the defocus amount (focusing determination result information) relating to the driving of the lens just before the image capturing relating to the correction target pixel value is acquired by the defect correcting unit 810 (Step S941). Subsequently, the deviation amount of the image capturing object of the defective phase difference detecting pixel (comparison range) is calculated on the basis of the movement amount of the image of the opposite side and the defocus amount (Step S942).

The movement amount of the image on the defective phase difference detecting pixel side is calculated on the basis of the deviation amount of the image capturing object of the defective phase difference detecting pixel and the movement amount of the image of the opposite side (Step S943).

As described above, according to the third embodiment of the present disclosure, the movement amount of the photography subject is calculated, the pixel value of the defective phase difference detecting pixel is corrected using the calculated movement amount, and thus it is possible to improve precision in correction.

In FIG. 11 to FIG. 13, the case of using the pixel value of the opposite side phase difference detecting pixel to the side of the defective phase difference detecting pixel has been described, but the embodiment is not limited thereto. For example, it is conceivable to calculate the deviation amount of the image capturing object of the defective phase difference detecting pixel using the pixel values of the image generating pixels.

In this example, the image capturing device 800 is provided with a unit that stores the pixel values of the image generating pixels of the image capturing data ((n−1)-th) instead of the opposite side pixel value storing unit 610. The defect correcting unit 810 generates the distribution data of the image capturing data (n-th) and the image capturing data ((n−1)-th) from the pixel values of the G pixels adjacent to the comparison range, and calculates the deviation amount of the image capturing object from the deviation of the position of the edge in such distribution data.

The defect correcting unit 810 calculates the movement amount of the image on the defective phase difference detecting pixel side on the basis of the movement amount of the image on the defective phase difference detecting pixel side based on the movement of the focus lens calculated from the defocus amount and the deviation amount of the image capturing object calculated from the distribution data of the G pixels. Specifically, as shown in FIG. 12A to FIG. 12D, when the deviation amount in the pixel values of the G pixels is the shift to the right by one pixel, the defect correcting unit 810 calculates that the photography subject is shifted to the right by one pixel. When the movement amount of the image on the defective phase difference detecting pixel side based on the driving amount of the focus lens is the shift to the right by two pixels, the defect correcting unit 810 calculates that the image on the defective phase difference detecting pixel side is shifted to the right by three pixels.

In this example, the G pixels have been described, but the same is embodied even using the R pixels and the B pixels. Brightness signals (Y signals) generated from the G pixels, the R pixels, and the B pixels may be used. The deviation amount of the image capturing object may be calculated using the existing photography subject recognizing algorithm.

As described above, according to the embodiments of the present disclosure, the pixel value of the defective phase difference detecting pixel is corrected from the pixel values of the phase difference detecting pixels in the image data (image data previous by one frame) by the previous image capturing of the correction target image data, and thus it is possible to improve precision in correction. In the image capturing device of the related art in which the correction is performed using the pixel values of the adjacent phase difference detecting pixels, the correction is not appropriately performed when the defective phase difference detecting pixel is the edge. According to the embodiments of the present disclosure, since it is possible to appropriately perform the correction even when the defective phase difference detecting pixel is the edge, the precision of the detection of the edge relating to the phase difference detection is improved when an image of the high frequency photography subject or the high contrast photography subject is captured. That is, it is possible to improve performance of the phase difference auto focus.

In the image capturing device of the related art, since the correction is performed using the pixel values of the adjacent phase difference detecting pixels, the correction is performed with reference to the pixel value of the defective pixel when there is an area where a plurality of defective pixels are collected, and thus it is difficult to appropriately perform the correction. In the embodiments of the present disclosure, when the movement amount of the image is large, the correction is performed using the pixel value of the position getting away from the position of the defective pixel, and thus it is possible to perform the correction with high precision even when there is an area where a plurality of defective pixels are collected. That is, according to the embodiments of the present disclosure, it is possible to improve a yield ratio in the step of producing the image capturing element.

In the embodiments of the present disclosure, it is assumed that the movement amount of the image is an integer, but it is conceivable that the movement amount of the image is not an integer (for example, the shift to the right by 1.5 pixels). In this case, the pixel value at the position to the left by 1.5 pixels is generated from the pixel value of the position to the left by one pixel before moving and the pixel value of the position to the left by two pixels before moving, by linear interpolation, and the correction may be performed using the generated pixel value.

In the embodiments of the present disclosure, it is assumed that there is only one defective phase difference detecting pixel on one side of one pair of phase difference detecting pixels, but the present disclosure is not limited thereto. Even when there are the defective phase difference detecting pixels on both sides of one pair of phase difference detecting pixels, the brightness value of each of the other phase difference detecting pixels may be the opposite side pixel value and is calculated, thereby embodying the case in the same manner as the embodiments of the present disclosure.

In the embodiments of the present disclosure, it is assumed that the color filters provided in the image generating pixels are the color filters of 3 primary colors (RGB), but the present disclosure is not limited thereto. For example, even when the image generating pixels are provided with complementary color filters, the same is applied. Even when the pixels (for example, an image capturing element in which blue pixels, green pixels, and red pixels are disposed again in the optical axis direction) detecting all light of a wavelength of a visible ray in one pixel area are the image generating pixels, the same as the embodiments of the present disclosure can be applied.

In the embodiments of the present disclosure, it is assumed that the phase difference detecting pixel receives one of light subjected to pupil division into two, but the present disclosure is not limited thereto. For example, even when the phase difference detecting pixels provided with two light receiving elements and receiving the light subjected to the pupil division by the light receiving elements are disposed, the embodiments of the present disclosure can be applied.

In the embodiments of the present disclosure, only the phase difference detecting pixels performing the pupil division to the left and right in the phase difference detecting pixels are assumed, but the present disclosure is not limited thereto, and the same is performed on up, down, and oblique phase difference detecting pixels. The pattern of the pixel disposition shown in FIG. 2 is not limited thereto, and the same is performed in the case of disposition pattern in which it is possible to perform the phase difference detection.

The embodiments of the present disclosure represent an example for embodying the present disclosure; as described in the embodiments of the present disclosure, items in the embodiments of the present disclosure and specific items in Claims have correspondence. Similarly, specific items in Claims and items in the embodiments of the present disclosure to which the same name as that is given have correspondence. However, the present disclosure is not limited to the embodiments, and may be embodied by variously modifying the embodiments within the scope which does not deviate from the concept of the present disclosure.

The process sequence described in the embodiments of the present disclosure may be understood as a method having a series of sequences, and may be understood as a program for causing a computer to execute the series of sequences or a recording medium storing the program. As the recording medium, for example, a CD (Compact Disc), an MD (Mini Disc), a DVD (Digital Versatile Disc), a memory card, and a Blu-ray Disc (registered trademark) may be used.

The present disclosure contains subject matter related to that disclosed in Japanese Priority Patent Application JP 2011-002667 filed in the Japan Patent Office on Jan. 11, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   circuitry configured to
      detect a movement amount of an image between first image data constituting image data generated by an image capturing element provided with a plurality of image generating pixels generating pixel values for generating an image and a plurality of pairs of phase difference detecting pixels generating pixel values for performing focusing determination by phase difference detection, and second image data subsequent to the first image data on a time axis and
      correct a pixel value of a defective phase difference detecting pixel included in one of the plurality of pairs of phase difference detecting pixels in the second image data on the basis of the detected movement amount and a pixel value of one phase difference detecting pixel in the first image data corresponding to the defective pixel.

2. The image processing device according to claim 1, wherein the second image data is image data generated after the first image data on the time axis.

3. The image processing device according to claim 2, wherein the circuitry is further configured to:
calculate a defocus amount by the phase difference detection on the basis of the pixel values of the phase difference detecting pixels; and
detect the movement amount on the basis of the defocus amount calculated from the pixel values of the phase difference detecting pixels in the first image data.

4. The image processing device according to claim 2, wherein the circuitry is configured to:
calculate the movement amount of the image of the other phase difference detecting pixel on the basis of a distance between the image of the other phase difference detecting pixel in the first image data and the image of the other phase difference detecting pixel in the second image data; and
detect the movement amount of the image of one phase difference detecting pixel on the basis of the calculated movement amount of the image of the other phase difference detecting pixel.

5. The image processing device according to claim 2, wherein the circuitry is configured to:
calculate a defocus amount by the phase difference detection on the basis of the pixel values of the phase difference detecting pixels;
calculate the movement amount of the image of the other phase difference detecting pixel on the basis of a distance between the image of the other phase difference detecting pixel in the first image data and the image of the other phase difference detecting pixel in the second image data; and
detect the movement amount of the image of one phase difference detecting pixel on the basis of the movement amount of the image of the other phase difference detecting pixel and the defocus amount calculated from the pixel values of the phase difference detecting pixels in the first image data.

6. The image processing device according to claim 5, wherein the circuitry is configured to:
calculate a deviation amount of a position relating to an object included in the second image data corresponding to the position of the defective pixel between the first image data and the second image data on the basis of the defocus amount and the movement amount of the image of the other phase difference detecting pixel; and
detect the movement amount of the image of one phase difference detecting pixel on the basis of the calculated deviation amount and the defocus amount.

7. The image processing device according to claim 2, wherein the circuitry is configured to:
calculate a defocus amount by the phase difference detection on the basis of the pixel values of the phase difference detecting pixels
calculate the movement amount of the image of the image generating pixel on the basis of the distance between the image of the image generating pixel in the first image data and the image of the image generating pixel in the second image data; and
detect the movement amount of the image of one phase difference detecting pixel on the basis of the calculated movement amount of the image of the image generating pixel and the defocus amount calculated from the pixel value of the phase difference detecting pixel in the first image data.

8. The image processing device according to claim 7, wherein the image generating pixels include a red pixel covered with a red filter blocking light other than a wavelength area representing red, a blue pixel covered with a blue filter blocking light other than a wavelength area representing blue, and a green pixel covered with a green filter blocking light other than a wavelength area representing green, and
wherein the movement amount of the image of the pixel generating pixel is a movement amount of an image of the green pixel.

9. An image capturing device comprising:
an image capturing element that includes a plurality of image generating pixels generating pixel values for generating an image, and a plurality of pairs of phase difference detecting pixels generating pixel values for performing focusing determination by phase difference detection; and
circuitry configured to
detects a movement amount of an image between first image data constituting image data generated by the image capturing element and second image data subsequent to the first image data on a time axis;
correct a pixel value of a defective phase difference detecting pixel included in one of the plurality of pairs of phase difference detecting pixels in the second image data on the basis of the detected movement amount and a pixel value of one phase difference detecting pixel in the first image data corresponding to the defective pixel;
determine whether or not it is focused on a focus target object on the basis of the corrected pixel value of the phase difference detecting pixels; and
control driving of a lens on the basis of the determination result of the determination unit.

10. An image processing method comprising:
detecting a movement amount of an image between first image data constituting image data generated by an image capturing element provided with a plurality of image generating pixels generating pixel values for generating an image and a plurality of pairs of phase difference detecting pixels generating pixel values for performing focusing determination by phase difference detection, and second image data subsequent to the first image data on a time axis; and
correcting a pixel value of a defective phase difference detecting pixel included in one of the plurality of pairs of phase difference detecting pixels in the second image data on the basis of the detected movement amount and a pixel value of one phase difference detecting pixel in the first image data corresponding to the defective pixel.

11. A non-transitory computer readable medium including a program for causing a computer to execute:
detecting a movement amount of an image between first image data constituting image data generated by an image capturing element provided with a plurality of image generating pixels generating pixel values for generating an image and a plurality of pairs of phase difference detecting pixels generating pixel values for performing focusing determination by phase difference detection, and second image data subsequent to the first image data on a time axis; and
correcting a pixel value of a defective phase difference detecting pixel included in one of the plurality of pairs of phase difference detecting pixels in the second image data on the basis of the detected movement amount and a pixel value of one phase difference detecting pixel in the first image data corresponding to the defective pixel.

* * * * *